(12) United States Patent
Saito

(10) Patent No.: US 6,781,943 B2
(45) Date of Patent: Aug. 24, 2004

(54) OBJECTIVE LENS AND OPTICAL PICK-UP DEVICE FOR REPRODUCING AND/OR RECORDING OF INFORMATION

(75) Inventor: Shinichiro Saito, Tokyo (JP)

(73) Assignee: Konica Corporation, Tokyo (JP)

( * ) Notice: Subject to any disclaimer, the term of this patent is extended or adjusted under 35 U.S.C. 154(b) by 364 days.

(21) Appl. No.: 09/786,438

(22) PCT Filed: Dec. 7, 2000

(86) PCT No.: PCT/JP00/08672

§ 371 (c)(1),
(2), (4) Date: Mar. 6, 2001

(87) PCT Pub. No.: WO01/43127

PCT Pub. Date: Jun. 14, 2001

(65) Prior Publication Data

US 2002/0191526 A1 Dec. 19, 2002

(30) Foreign Application Priority Data

Dec. 10, 1999 (JP) .......................... 11-351930

(51) Int. Cl.$^7$ .................................. G11B 7/00
(52) U.S. Cl. .................. 369/112.08; 369/112.07; 369/112.13; 369/112.19
(58) Field of Search ................ 369/112.07, 112.06, 369/112.08, 112.13, 112.19

(56) References Cited

U.S. PATENT DOCUMENTS

| | | | | | |
|---|---|---|---|---|---|
| 4,768,867 | A | * | 9/1988 | Suda ........................... | 350/423 |
| 4,832,464 | A | * | 5/1989 | Kato et al. .................. | 350/3.72 |
| 5,920,537 | A | * | 7/1999 | Komma et al. ............. | 369/112 |
| 6,061,324 | A | * | 5/2000 | Arai et al. ................... | 369/112 |
| 6,313,956 | B1 | * | 11/2001 | Saito ............................ | 359/721 |
| 6,363,037 | B1 | * | 3/2002 | Yamazaki .............. | 369/112.26 |
| 6,370,103 | B1 | * | 4/2002 | Yamazaki et al. ...... | 369/112.26 |
| 6,498,775 | B1 | * | 12/2002 | Fan et al. ..................... | 369/94 |

* cited by examiner

Primary Examiner—Gautam R. Patel
(74) Attorney, Agent, or Firm—Finnegan, Henderson, Farabow, Garrett & Dunner, L.L.P.

(57) ABSTRACT

In an optical pickup device for conducting reproducing and/or recording of information in at least two kinds of optical information recording media, an optical element divides a light flux into $k(k \geq 4)$ pieces of ring-shaped light flux. When reproducing or recording is conduced for a first optical information recording medium, the first light flux and the k-th light flux are converged on the first information recording surface and at least two pieces of light flux of the second light flux to the (k-1)th light flux form an apparent best image plane at a position different from the position of the best image plane formed by the first light flux and the k-th light flux. A wave front aberration of each light flux passing in a required numerical aperture for the first optical information recording medium is made approximately $m_i \lambda_1$.

20 Claims, 12 Drawing Sheets

THICKNESS ON THE OPTICAL AXIS OF DIVIDED SURFACES

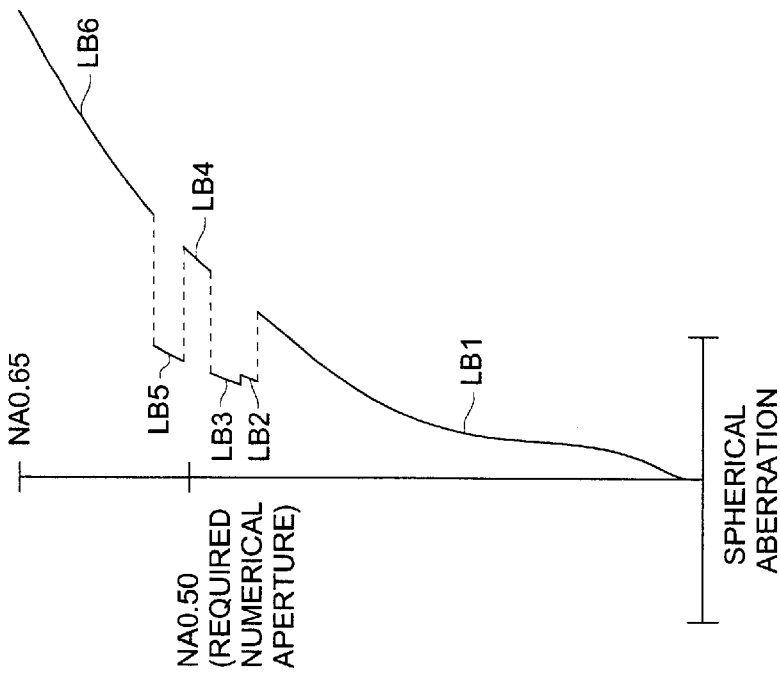
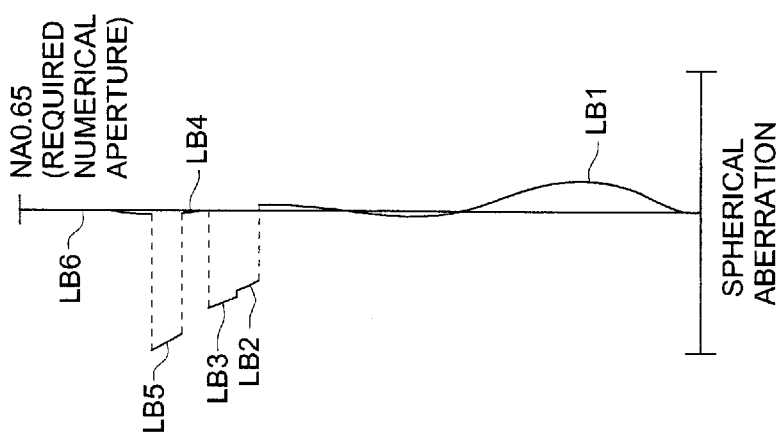

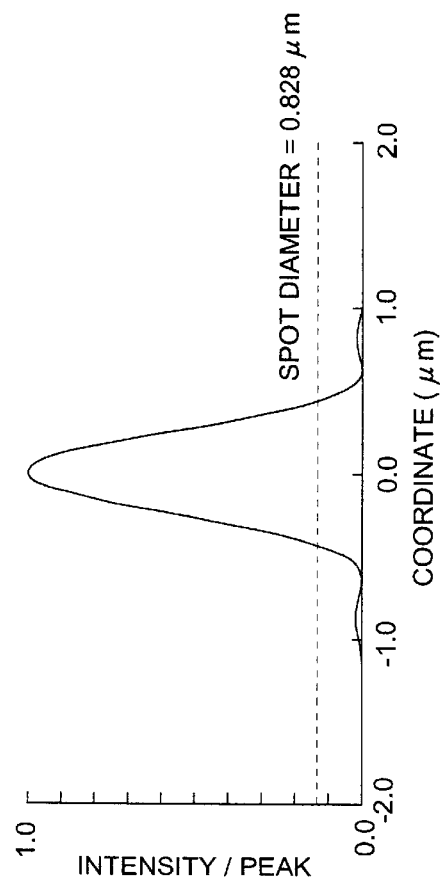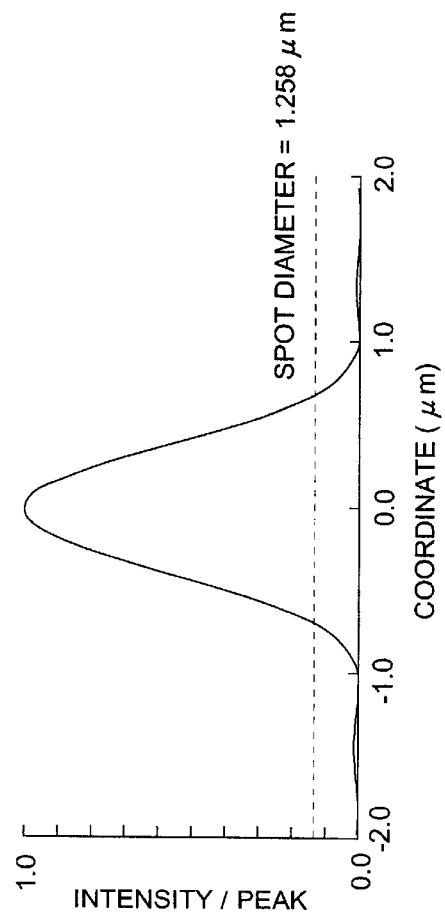
FIG. 12 (a)
FIG. 12 (b)

OBJECTIVE LENS AND OPTICAL PICK-UP DEVICE FOR REPRODUCING AND/OR RECORDING OF INFORMATION

TECHNICAL FIELD

This invention relates to an objective lens for use in an optical pickup device which is capable of carrying out the reproducing and/or recording of optical disks having different thicknesses of the transparent substrate respectively and uses light sources having different wavelengths respectively and an optical pickup device employing said lens.

BACKGROUND OF THE INVENTION

In recent years, accompanied by the practical use of the red semiconductor laser having a short wavelength, it has been advanced the development of a high-density optical disk DVD (digital video disk) which has about the same size as a conventional optical disk CD (compact disk) and has been made to have a large capacity. In an optical pickup device for carrying out recording and/or reproducing of information for this DVD, in the case where a semiconductor laser having a short wavelength of 635 nm is used for the light source, the numerical aperture NA of the objective lens at the side of the optical disk for converging the above-mentioned laser beam is made approximately 0.6. Further, in addition to the CD and DVD, optical disks of various standards, for example, a CD-R (a direct read after write, writing once compact disk), an MD (a mini-disk), etc. are commercialized and have come into general use. In Table 1, the thickness of the transparent substrate and the required numerical aperture of various optical disks are shown.

TABLE 1

| Optical disk | Thickness of transparent substrate (mm) | Required numerical aperture (light source wavelength $\lambda$ nm) |
|---|---|---|
| CD, CD-R (reproducing only) | 1.2 | 0.45 ($\lambda$ = 780) |
| CD-R (recording, reproducing) | 1.2 | 0.50 ($\lambda$ = 780) |
| LD | 1.25 | 0.50 ($\lambda$ = 780) |
| MD | 1.2 | 0.45 ($\lambda$ = 780) |
| MO (3.5 inch, 230 MB) | 1.2 | 0.55 ($\lambda$ = 780) |
| MO (3.5 inch, 6400 MB) | 1.2 | 0.55 ($\lambda$ = 680) |
| DVD | 0.6 | 0.60 ($\lambda$ = 635) |

Further, in an optical pickup device for carrying out the recording and/or reproducing for a CD-R, it is necessary that the wavelength of the light source $\lambda$ is equal to 780 nm; however, for other optical disks, it is possible to use a light source having a wavelength other than the wavelengths noted in Table 1, and in such cases, the required numerical aperture NA is made to be varied in accordance with the light source wavelength $\lambda$ used. For example, the required numerical aperture NA is approximately expressed by NA=$\lambda$ ($\mu$m)/1.73 for a CD, and by NA=$\lambda$($\mu$m)/1.06 for a DVD. The numerical aperture (required numerical aperture) referred to in this specification means the numerical aperture of a converging optical system as seen from the side of the optical disk, and the required numerical aperture means the numerical aperture calculated from the spot size d which is required on the recording surface of the optical disk and the used wavelength $\lambda$, to be expressed generally by NA=0.83×$\lambda$÷d.

As described in the above, there are various optical disks which are different in the thickness of the transparent substrate, the recording density, and the used wavelength on the market; however, it is a large burden for a user to purchase an apparatus for recording and/or reproducing information capable of recording and/or reproducing information to be exclusively used for each of the optical disks. Therefore, it has been proposed an apparatus for recording and/or reproducing information equipped with an interchangeable optical pickup device capable of coping with various optical disks.

For such an optical pickup device, one that is provided with converging optical systems corresponding to different optical disks respectively, and is designed to switch over the optical systems in accordance with the optical disk to reproduce has been proposed. However, in this optical pickup device, a plurality of converging optical systems are required which makes the structure complicated, resulting in making the cost high, which is not desirable.

Therefore, it has been proposed an optical pickup device which reproduces a plurality of optical disks using a single converging optical system. For example, in the publication of the unexamined patent application H7-302437, it is disclosed an optical pickup device which carries out reproducing by dividing the refracting surface into a plurality of ring-shaped bands and making each of the divisional surfaces converge the beam on one of the optical disks having different thicknesses respectively.

However, the optical pickup device disclosed in the publication of the unexamined patent application H7-302437 has the problem that it requires a large laser output because the single objective lens has more than two focal points simultaneously which reduces the spot light quantity per each focal point.

On the other hand, the applicant has proposed the following optical pickup device in the publication of the unexamined patent application H11-96585. That is, the optical pickup device comprises an objective lens provided with a plurality of ring-shaped bands obtained through dividing the lens surface by concentric circles, wherein, for a plurality of light sources having different wavelengths respectively and plural transparent substrates having different thicknesses respectively, each of the ring-shaped bands has its aberration corrected to the refraction limit or under for each of the optical disks by positively utilizing the spherical aberration produced by them. This objective lens has a function that the required numerical aperture can be automatically obtained in accordance with the used wavelength and/or the thickness of the transparent substrate.

However, in the case where the correction is made to the refraction limit or under, it is more desirable to take it into consideration the intensity distribution in the point image, that is, the central intensity of the spot light, in addition to the spot size (spreading of the point image). In order to make this central intensity higher, it is necessary to remark-the phase of the light flux (deviation of the wave front aberration), but there is no description concerning this deviation of the wave front aberration with respect to the optical pickup device disclosed in the publication of unexamined patent application H11-96585.

It is an object of this invention to provide an optical pickup device comprising an objective lens which has four or more divisional surfaces formed and is capable of correcting the deviation of the wave front aberration in the divisional surfaces inside the required numerical aperture for each of the optical disks and the objective lens. Further, it is another object of this invention to provide an optical pickup device and an objective lens having a small amount of loss of light quantity and an excellent S-letter characteristic.

DISCLOSURE OF THE INVENTION

The above-mentioned objects are accomplished by any one of the following structures.

(1-1) An optical pickup device for conducting reproducing and/or recording of information in at least two kinds of optical information recording media, comprises a first light source to emit light flux having a first wavelength (λ1) in order to conduct reproducing and/or recording of the information in a first optical information recording medium having a first transparent substrate;

a second light source to emit light flux having a second wavelength (λ2) longer than the first wavelength in order to conduct reproducing and/or recording of the information of a second optical information recording medium having a second transparent substrate;

a converging optical system for converging the light flux having the first wavelength or the light flux having the second wavelength on the first information recording surface of the first optical information recording medium or on the second information recording surface of the second optical information recording medium; and an optical detector for receiving and detecting the light flux reflected by the first information recording surface or by the second information recording surface, wherein a required numerical aperture for the first optical information recording medium is larger than that for the second optical information recording medium;

wherein the converging optical system comprises at least one optical element and the optical element has ring-shaped divided surfaces partitioned by stepped portions on at least one surface for dividing the light flux incident on the optical element into k (k≧4) pieces of ring-shaped light flux in which light flux nearest to the optical axis of the optical element is regarded as the first light flux and other light flux are called consecutively the second, the third - - - , and the k-th light flux toward the outer side in the direction perpendicular to the optical axis;

wherein when conducting reproducing or recording of the first optical information recording medium, the first light flux and the k-th light flux among the light flux of the first wavelength having passed the ring-shaped divided surfaces are converged on the first information recording surface in order to conduct reproducing or recording of the information of the first optical information recording medium, a spherical aberration component of a wave front aberration is made 0.05λ1 rms or less at a position of the best image plane, and at least two pieces of light flux among the light flux of the first wavelength from the second light flux to the (k−1)th light flux form an apparent best image plane at a position different from the position of the best image plane formed by the first light flux and the k-th light flux; and wherein at the position of the best image plane of the first light flux and the k-th light flux, a wave front aberration of a ray in each light flux of the firs wavelength from the first light flux to the k-th light flux passing in a required numerical aperture for the first optical information recording medium is made approximately $m_i \lambda_1$, where $m_i$ is an integer and i=1, 2, - - - , k.

(1-2) In the optical pickup device set forth in (1-1), when conducting reproducing or recording of the first optical information recording medium, at the position of the best image plane of the first light flux and k-th light flux, an amount of the wave front aberration (w1) of the ray in each light flux of the first wavelength from the first light flux to the $k^{th}$ light flux passing in the required numerical aperture for the first optical information recording medium satisfies the following conditional formula:

$$(m_i - 0.30)\lambda_1 \leq w1 \leq (mi+0.30)\lambda_1$$

(1-3) In the optical pickup device set forth in (1-1), when conducting reproducing or recording of the second optical information recording medium, the first light flux among the light flux of the second wavelength having passed the ring-shaped divided surfaces is converged on the second information recording surface in order to conduct reproducing or recording of the information of the second optical information recording medium, a spherical aberration component of a wave front aberration is made 0.07λ2 rms or less at a position of the best image plane, and at the position of the best image plane of the first light flux, a wave front aberration of a ray in each light flux of the second wavelength from the first light flux to the (k−1)th light flux passing in a required numerical aperture for the second optical information recording medium is made approximately $n_i \lambda_2$, where $n_i$ is an integer and i=1, 2, - - - , k−1.

(1-4) In the optical pickup device set forth in (1-3), when conducting reproducing or recording of the second optical information recording medium, at the position of the best image plane of the first light flux, an amount of a wave front aberration (w2) of a ray in each light flux of the second wavelength from the first light flux to (k−1)th light flux passing in a required numerical aperture for the second optical information recording medium satisfies the following conditional formula:

$$(n_i - 0.30)\lambda_2 \leq w2 \leq (n_i+0.30)\lambda_2$$

(1-5) In the optical pickup device set forth in (1-3), the difference between the maximum value of the integer mi and the minimum value of the integer mi and the difference between the maximum value of the integer ni and the minimum value of the integer ni both are 2 or more.

(1-6) In the optical pickup device set forth in (1-1), k is 4 and the following conditional formulas are satisfied:

$$0.62 \leq h1/0.5\phi max \leq 0.69$$

$$0.70 < h3/0.5\phi max \leq 0.80$$

where φmax denotes a diameter of an aperture stop when conducting reproducing or recording of the first optical information recording medium, hi denotes a height from a boundary of the ring-shaped stepped portion to divide the light flux of the first wavelength into the first light flux and the second light flux to the optical axis, and h3 denotes a height from a boundary of the ring-shaped stepped portion to divide the light flux of the first wavelength into the third light flux and the fourth light flux to the optical axis.

(1-7) In the optical pickup device set forth in (1-1), k is 6, and when conducting reproducing or recording of the first optical information recording medium, the second light flux and the fifth light flux in the light flux of the first wavelength form an apparent best image plane at a position different from the position of the best image plane formed by the sixth light flux.

(1-8) In the optical pickup device set forth in (1-1), k is 6 and the following conditional formulas are satisfied:

$$0.52 \leq h1/0.5\phi max \leq 0.67$$

$$0.70 < h5/0.5\phi max \leq 0.82$$

where $\phi max$ denotes a diameter of an aperture stop when conducting reproducing or recording of the first optical information recording medium, h1 denotes a height from a boundary of the ring-shaped stepped portion to divide the light flux of the first wavelength into the first light flux and the second light flux to the optical axis, and h5 denotes a height from a boundary of the ring-shaped stepped portion to divide the light flux of the first wavelength into the fifth light flux and the sixth light flux to the optical axis.

(1-9) In the optical pickup device set forth in (1-1), the optical element is an objective lens having an aspherical surface.

(1-10) In the optical pickup device set forth in (1-1), when conducting reproducing or recording of the first optical information recording medium, in the ring-shaped divided surfaces to pass at least two pieces of light flux among the first light flux of the first wavelength from the second light flux to the (k−1)th light flux to form an apparent best image plane at a position different from that of the best image plane formed by the first light flux and the k-th light flux, a depth of the stepped portion of the ring-shaped divided surfaces at the optical axis side is different from a depth of the stepped portion at a side reverse to the optical axis side.

(1-11) In the optical pickup device set forth in (1-9), when conducting reproducing or recording of the first optical information recording medium, in the ring-shaped divided surfaces to pass at least two pieces of light flux among the first light flux of the first wavelength from the second light flux to the (k−1)th light flux to form an apparent best image plane at a position different from that of the best image plane formed by the first light flux and the k-th light flux, an aspherical shape of the ring-shaped divided surfaces is different from that of the other ring-shaped divided surfaces.

(1-12) An objective lens for use in an optical pickup device for conducting reproducing and/or recording of information of at least two kinds of optical information recording media, comprising:

ring-shaped divided surfaces partitioned by stepped portions provided on at least one surfaces of the objective lens, wherein the ring-shaped divided surfaces divide light flux incident on the objective lens into k (k≧4) pieces of ring-shaped light flux in which light flux nearest to the optical axis of the optical element is regarded as the first light flux and other light flux are called consecutively the second, the third - - - , and the k-th light flux toward the outer side in the direction perpendicular to the optical axis;

wherein when conducting reproducing or recording of a first optical information recording medium having a first transparent substrate, among a first light flux of a wavelength (λ1) having passed the ring-shaped divided surfaces, the first light flux and the k-th light flux are converged on a first information recording surface so as to conduct reproducing or recording of information of the first optical information recording medium, a spherical aberration component of a wave front aberration is made 0.05λ1 rms or less at a position of the best image plane, and at least two pieces of light flux among the light flux of the first wavelength from the second light flux to the (k−1)th light flux form an apparent best image plane at a position different from the position of the best image plane formed by the first light flux and the k-th light flux; and wherein at the position of the best image plane of the first light flux and the k-th light flux, a wave front aberration of a ray in each light flux of the firs wavelength from the first light flux to the k-th light flux passing in a required numerical aperture for the first optical information recording medium is made approximately $m_i\lambda_1$, where $m_i$ is an integer and i=1, 2, - - - , k.

(1-13) In the objective lens set forth in (1-12), when conducting reproducing or recording of the first optical information recording medium, at the position of the best image plane of the first light flux and k-th light flux, an amount of the wave front aberration (w1) of the ray in each light flux of the first wavelength from the first light flux to the k-th light flux passing in the required numerical aperture for the first optical information recording medium satisfies the following conditional formula:

$$(m_i-0.30)\lambda_1 \leq w1 \leq (mi+0.30)\lambda_1$$

(1-14) In the objective lens set forth in (1-12), when conducting reproducing or recording of the second optical information recording medium having a second transparent substrate thicker than the first transparent substrate, the first light flux among the light flux of the second wavelength having passed the ring-shaped divided surfaces is converged on the second information recording surface in order to conduct reproducing or recording of the information of the second optical information recording medium, a spherical aberration component of a wave front aberration is made 0.07λ2 rms or less at a position of the best image plane, and at the position of the best image plane of the first light flux, a wave front aberration of a ray in each light flux of the second wavelength from the first light flux to the (k−1)th light flux passing in a required numerical aperture for the second optical information recording medium is made approximately $n_i\lambda_2$, where $n_i$ is an integer and i=1, 2, - - - , k−1.

(1-15) In the objective lens set forth in (1-14), when conducting reproducing or recording of the second optical information recording medium, at the position of the best image plane of the first light flux, an amount of a wave front aberration (w2) of a ray in each light flux of the second wavelength from the first light flux to (k−1)th light flux passing in a required numerical aperture for the second optical information recording medium satisfies the following conditional formula:

$$(n_i-0.30)\lambda_2 \leq w2 \leq (n_i+0.30)\lambda_2$$

(1-16) In the objective lens set forth in (1-14), the difference between the maximum value of the integer mi and the minimum value of the integer mi and the difference between the maximum value of the integer ni and the minimum value of the integer ni both are 2 or more.

(1-17) In the objective lens set forth in (1-12), k is 4 and the following conditional formulas are satisfied:

$$0.62 \leq h1/0.5\phi max \leq 0.69$$

$$0.70 < h3/0.5\phi max \leq 0.80$$

where $\phi max$ denotes a diameter of an aperture stop when conducting reproducing or recording of the first optical information recording medium, h1 denotes a height from a boundary of the ring-shaped stepped portion to divide the light flux of the first wavelength into the first light flux and the second light flux to the optical axis, and h3 denotes a height from a boundary of the ring-shaped stepped portion to divide the light flux of the first wavelength into the third light flux and the fourth light flux to the optical axis.

(1-18) In the objective lens set forth in (1-12), k is 6, and when conducting reproducing or recording of the first optical information recording medium, the second light flux and the fifth light flux in the light flux of the first wavelength form an apparent best image plane at a position different from the position of the best image plane formed by the sixth light flux.

(1-19) In the objective lens set forth in (1-12), k is 6 and the following conditional formulas are satisfied:

$$0.52 \leq h1/0.5\phi max \leq 0.67$$

$$0.70 \leq h5/0.5\phi max \leq 0.82$$

where $\phi max$ denotes a diameter of an aperture stop when conducting reproducing or recording of the first optical information recording medium, h1 denotes a height from a boundary of the ring-shaped stepped portion to divide the light flux of the first wavelength into the first light flux and the second light flux to the optical axis, and h5 denotes a height from a boundary of the ring-shaped stepped portion to divide the light flux of the first wavelength into the fifth light flux and the sixth light flux to the optical axis.

(1-20) In the objective lens set forth in (1-12), when conducting reproducing or recording of the first optical information recording medium, in the ring-shaped divided surfaces to pass at least two pieces of light flux among the first light flux of the first wavelength from the second light flux to the (k−1)th light flux to form an apparent best image plane at a position different from that of the best image plane formed by the first light flux and the k-th light flux, a depth of the stepped portion of the ring-shaped divided surfaces at the optical axis side is different from a depth of the stepped portion at a side reverse to the optical axis side.

(1-21) In the objective lens set forth in (1-12), when conducting reproducing or recording of the first optical information recording medium, in the ring-shaped divided surfaces to pass at least two pieces of light flux among the first light flux of the first wavelength from the second light flux to the (k−1)th light flux to form an apparent best image plane at a position different from that of the best image plane formed by the first light flux and the k-th light flux, an aspherical shape of the ring-shaped divided surfaces is different from that of the other ring-shaped divided surfaces.

(1-22) An optical information recording media reproducing or recording apparatus for conducting reproducing and/or recording of information in at least two kinds of optical information recording media, comprising:

an optical pickup device comprising a first light source to emit light flux having a first wavelength ($\lambda$1) in order to conduct reproducing and/or recording of the information in a first optical information recording medium having a first transparent substrate;

a second light source to emit light flux having a second wavelength ($\lambda$2) longer than the first wavelength in order to conduct reproducing and/or recording of the information of a second optical information recording medium having a second transparent substrate;

a converging optical system for converging the light flux having the first wavelength or the light flux having the second wavelength on the first information recording surface of the first optical information recording medium or on the second information recording surface of the second optical information recording medium; and an optical detector for receiving and detecting the light flux reflected by the first information recording surface or by the second information recording surface, wherein a required numerical aperture for the first optical information recording medium is larger than that for the second optical information recording medium;

wherein the optical pickup device comprises at least one optical element and the optical element has ring-shaped divided surfaces partitioned by stepped portions on at least one surface for dividing the light flux incident on the optical element into k (k>4) pieces of ring-shaped light flux in which light flux nearest to the optical axis of the optical element is regarded as the first light flux and other light flux are called consecutively the second, the third - - - , and the k-th light flux toward the outer side in the direction perpendicular to the optical axis;

wherein when conducting reproducing or recording of the first optical information recording medium, the first light flux and the k-th light flux among the light flux of the first wavelength having passed the ring-shaped divided surfaces are converged on the first information recording surface in order to conduct reproducing or recording of the information of the first optical information recording medium, a spherical aberration component of a wave front aberration is made $0.05\lambda 1$ rms or less at a position of the best image plane, and at least two pieces of light flux among the light flux of the first wavelength from the second light flux to the (k−1)th light flux form an apparent best image plane at a position different from the position of the best image plane formed by the first light flux and the k-th light flux; and wherein at the position of the best image plane of the first light flux and the k-th light flux, a wave front aberration of a ray in each light flux of the firs wavelength from the first light flux to the k-th light flux passing in a required numerical aperture for the first optical information recording medium is made approximately $m_i\lambda$, where mi is an integer and i=1, 2, - - - , k.

Further, the above-mentioned objects are accomplished also by any one of the following desirable structures.

(2-1) An objective lens for use in an optical pickup device which comprises a converging optical system including an objective lens for converging light flux from light sources having different wavelengths respectively on the recording surface of an optical disk and a light receiving means for detecting reflected light from said recording surface and is capable of recording and/or reproducing information for a first and a second optical disks having transparent substrates of different thicknesses respectively (wherein the required numerical aperture of the objective lens for the first optical disk is supposed to be larger than that for the second optical disk), wherein ring-shaped divisional surfaces for dividing the incident light flux by refracting action into k (k≧4) pieces of ring-shaped light flux (where the light flux are called consecutively the first, the second, - - - , and the k-th light flux from the optical axis side toward the outer side) are formed on at least one of the surfaces of said objective lens, when said first optical disk is used, the spherical aberration component of the wave front aberration of said first and k-th light flux at the position of the best image plane formed by said first and k-th light flux is $0.05\lambda_1$ rms or under ($\lambda_1$: the wavelength of the light source for the first optical disk), for at least two pieces of light flux among said second to (k−1)th light flux, the apparent position of the best image plane comes to a position different from said position of the best image plane formed by said first and k-th light flux, and at said position of the best image plane formed by said first and k-th light flux, the wave front aberration of the rays in each of said first to k-th light flux passing the inside of the required numerical aperture for said first optical disk becomes approximately $m_i\lambda_1$ ($m_i$ is an integer, where i=1, 2, - - -, k).

According to the objective lens described in the structure (2-1), because it is designed to make the residual aberration small for the thickness of the substrate falling within the range from the substrate thickness of said first optical disk to the substrate thickness of said second optical disk-the recording and/or reproducing of information can be suitably performed for plural kinds of optical disks.

(2-2) When the aforesaid first optical disk is used, at the aforesaid position of the best image plane formed by the aforesaid first and k-th light flux, the amount of the wave front aberration w1 of the rays in each of said first to k-th light flux satisfy the following condition:

$$(m_i-0.30)\lambda_1 \leq w1 \leq (m_i+0.30)\lambda_1 \quad (1).$$

This is because, for example, in the case where a DVD is used for the optical disk, if w1 does not satisfy the above expression (1), deviation of the wave front aberration is produced, which lowers the spot light intensity.

(2-3) When carrying out the recording and/or reproducing of information by using a light flux from the light source having a wavelength of $\lambda_2$ for the aforesaid second optical disk-the wave front aberration of the rays in the first to (k-1)th light flux becomes approximately $n_i\lambda_2$ ($n_i$ is an integer, where i=1, 2, - - -, k−1). Accordingly, in said second optical disk-the residual aberration can be made small, and owing to it, the recording and/or reproducing of information can be carried out for said second optical disk.

(2-4) When carrying out the recording and/or reproducing of information by using a light flux from the light source having a wavelength of $\lambda_2$ for the aforesaid second optical disk-the amount of the wave front aberration w2 of the rays in each of the said first to (k−1)th light flux satisfy the following condition in the required numerical number for said second optical disk:

$$(m_i-0.30)\lambda_2 \leq w2 \leq (m_i+0.30)\lambda_2 \quad (2).$$

For example, in the case where a CD is used for the optical disk, if w2 does not satisfy the above expression (2), deviation of the wave front aberration is produced, which lowers the spot light intensity.

(2-5) The difference between the maximum value of the aforesaid mi and its minimum value and the difference between the maximum value of the aforesaid ni and its minimum value are both 2 or larger.

(2-6) The aforesaid k is equal to 4, and when $\phi$max denotes the diameter of the aperture stop at the time of using the aforesaid first optical disk, hi denotes the height from the aforesaid step portion, the border of the ring-shaped bands, which divides the light flux into the first light flux and the second light flux, to the optical axis, and h3 denotes the height from the aforesaid step portion, the border of the ring-shaped bands, which divides the light flux into the third light flux and the fourth light flux, to the optical axis, these satisfy the following conditions:

$$0.62 \leq h1/0.5\phi\text{max} \leq 0.69 \quad (3),$$

and $$0.70 \leq h3/0.5\phi\text{max} \leq 0.80 \quad (4).$$

If h1/0.5$\phi$max is smaller than the lower limit value, the spot light intensity becomes low in the first optical disk, and on the contrary, if it exceeds the upper limit value, the wave front aberration of the first light flux is degraded in the second optical disk, which lowers the central intensity of the spot light. Further, if h3/0.5$\phi$max is smaller than the lower limit value, the spot size does not meet the required value in the second optical disk, and on the contrary, if it exceeds the upper limit value, the specification becomes excessive for the second optical disk, and as the bad influence of it, the spot light quantity at the time of using the first optical disk becomes insufficient.

(2-7) The aforesaid k is equal to 6, and the second light flux and the fifth light flux form the apparent best image plane at a position different from the position of the best image plane formed by the sixth light flux.

(2-8) The aforesaid k is equal to 6, and when $\phi$max denotes the diameter of the aperture stop at the time of using the first optical disk, h1 denotes the height from the aforesaid step portion, the border of the ring-shaped bands, which divides the light flux into the first light flux and the second light flux, to the optical axis, and h5 denotes the height from the aforesaid step portion, the border of the ring-shaped bands, which divides the light flux into the fifth light flux and the sixth light flux, to the optical axis, these satisfy the following conditions:

$$0.52 \leq h1/0.5\phi\text{max} \leq 0.67 \quad (5),$$

and $$0.70 \leq h5/0.5\phi\text{max} \leq 0.82 \quad (6).$$

If h1/0.5$\phi$max is smaller than the lower limit value, the central intensity of the spot light becomes low in the first optical disk, and on the contrary, if it exceeds the upper limit value, the wave front aberration of the first light flux is degraded in the second optical disk, which lowers the central intensity of the spot light. Further, if h5/0.5$\phi$max is smaller than the lower limit value, the spot size does not meet the required value in the second optical disk, and on the contrary, if it exceeds the upper limit value, the specification becomes excessive for the second optical disk, and as the bad influence of it, the spot light quantity at the time of using the first optical disk becomes insufficient.

(2-9) An optical pickup device for recording and/or reproducing information which comprises a converging optical system including an objective lens for converging light flux from light sources having different wavelengths respectively on the recording surface of an optical disk and a light receiving means for detecting reflected light from said recording surface and is capable of recording and/or reproducing information for a first and a second optical disks having transparent substrates of different thicknesses respectively (wherein the required numerical aperture of the objective lens for the first optical disk is supposed to be larger than that for the second optical disk), wherein ring-shaped divisional surfaces for dividing the incident light flux by refracting action into k (k≧4)

pieces of ring-shaped light flux (where the light flux are called consecutively the first, the second, - - -, and the k-th light flux from the optical axis side toward the outer side) are formed on at least one of the surfaces of said objective lens, when said first optical disk is used, the spherical aberration component of the wave front aberration of said first and k-th light flux at the position of the best image plane formed by said first and k-th light flux is $0.05\lambda_1$ rms or under ($\lambda_1$: the wavelength of the light source for the first optical disk), for at least two pieces of light flux among said second to (k−1)-th light flux, the apparent position of the best image plane comes to a position different from said position of the best image position formed by said first and k-th light flux, and at said position of the best image plane formed by said first and k-th light flux, the wave front aberration of the rays in each of said first to k-th light flux passing the inside of the required numerical aperture for said first optical disk becomes approximately $m_i\lambda_1$ ($m_i$ is an integer, where i=1, 2, - - -, k).

According to the optical pickup device described in the structure (2-9), because its objective lens is designed to make the residual aberration small for the thickness of the substrate falling within the range from the substrate thickness of said first optical disk to the substrate thickness of said second optical disk-the recording and/or reproducing of information can be suitably performed for plural kinds of optical disks.

(2-10) In the objective lens, when the aforesaid first optical disk is used, at the aforesaid position of the best image plane formed by the aforesaid first and k-th light flux, the amount of the wave front aberration w1 of the rays in each of said first to k-th light flux satisfies the following condition:

$$(m_i-0.30)\lambda_1 \leq w1 \leq (m_i+0.30)\lambda_1 \quad (1)$$

For example, in the case where a DVD is used for the optical disk, if w1 does not satisfy the above expression (1), deviation of the wave front aberration is produced, which lowers the spot light intensity.

(2-11) In the objective lens, in carrying out the recording or reproducing of information by using a light flux from the light source having a wavelength of $\lambda_2$ for the aforesaid second optical disk-the wave front aberration of the rays in the first to (k−1)th light flux becomes approximately $n_i\lambda_2$ ($n_i$ is an integer, where i=1, 2, - - -, k−1). Accordingly, in said second optical disk-the residual aberration can be made small, and owing to it, the recording and/or reproducing of information can be carried out for said second optical disk.

(2-12) In the objective lens, in carrying out the recording or reproducing of information by using a light flux from the light source having a wavelength of $\lambda_2$ for the aforesaid second optical disk-the amount of the wave front aberration w2 of the rays in each of the said first to (k−1)th light flux satisfies the following condition in the required numerical number for said second optical disk:

$$(n_i-0.30)\lambda_2 \leq w2 \leq (n_i+0.30)\lambda_2 \quad (2).$$

For example, in the case where a CD is used for the optical disk, if w2 does not satisfy the above expression (2), deviation of the wave front aberration is produced, which lowers the spot light intensity.

(2-13) In the objective lens, the difference between the maximum value of the aforesaid mi and its minimum value and the difference between the maximum value of the aforesaid ni and its minimum value are both 2 or larger.

(2-14) In the objective lens, the aforesaid k is equal to 4, and when $\phi$max denotes the diameter of the aperture stop at the time of using the aforesaid first optical disk, h1 denotes the height from the aforesaid step portion, the border of the ring-shaped bands, which divides the light flux into the first light flux and the second light flux, to the optical axis, and h3 denotes the height from the aforesaid step portion, the border of the ring-shaped bands, which divides the light flux into the third light flux and the fourth light flux, to the optical axis, these satisfy the following conditions:

$$0.62 \leq h1/0.5\phi\text{max} \leq 0.69 \quad (3),$$

and $$0.70 \leq h3/0.5\phi\text{max} \leq 0.80 \quad (4).$$

If $h1/0.5\phi$max is smaller than the lower limit value, the spot light intensity becomes low in the first optical disk, and on the contrary, if it exceeds the upper limit value, the wave front aberration of the first light flux is degraded in the second optical disk, which lowers the central intensity of the spot light. Further, if $h3/0.5\phi$max is smaller than the lower limit value, the spot size does not meet the required value in the second optical disk, and on the contrary, if it exceeds the upper limit value, the specification becomes excessive for the second optical disk, and as the bad influence of it, the spot light quantity at the time of using the first optical disk becomes insufficient.

(2-15) In the objective lens, the aforesaid k is equal to 6, and the second light flux and the fifth light flux form the apparent best image plane at a position different from the position of the best image plane formed by the sixth light flux.

(2-16) In the objective lens, the aforesaid k is equal to 6, and when $\phi$max denotes the diameter of the aperture stop at the time of using the first optical disk, h1 denotes the height from the aforesaid step portion, the border of the ring-shaped bands, which divides the light flux into the first light flux and the second light flux, to the optical axis, and h5 denotes the height from the aforesaid step portion, the border of the ring-shaped bands, which divides the light flux into the fifth light flux and the sixth light flux, to the optical axis, these satisfy the following conditions:

$$0.52 \leq h1/0.5\phi\text{max} \leq 0.67 \quad (5),$$

and $$0.70 \leq h5/0.5\phi\text{max} \leq 0.82 \quad (6).$$

If $h1/0.5\phi$max is smaller than the lower limit value, the central intensity of the spot light becomes low in the first optical disk, and on the contrary, if it exceeds the upper limit value, the wave front aberration of the first light flux is degraded in the second optical disk, which lowers the central intensity of the spot light. Further, if $h5/0.5\phi$max is smaller than the lower limit value, the spot size does not meet the required value in the second optical disk, and on the contrary, if it exceeds the upper limit value, the specification becomes excessive in the second optical disk, and as the bad influence of it, the spot light quantity at the time of using the first optical disk becomes insufficient.

In this specification, "an objective lens" in a narrow sense means a lens which has a light converging function and is arranged at the nearest position to the optical information recording medium opposite to it, and in a broad sense, it means a lens which is arranged at a position opposite to the optical information recording medium and is capable of moving in the direction of the optical axis by an actuator.

In this specification, as for the optical information recording medium (optical disk), not only present disk-shaped optical information recording media, for example, various kinds of CD's such as a CD, a CD-R, a CD-RW, a CD-Video, and a CD-ROM, various kinds of DVD's such as a DVD, a DVD-ROM, a DVD-RAM, a DVD-R, and a DVD-RW, and an MD, but also a recording medium of the next generation is included. On the information recording surface of most of the optical information recording media, a transparent substrate is present.

In this specification, "recording and reproducing of information" means recording information on the information recording surface of such an information recording medium as the above-mentioned, and reproducing information recorded on the information recording surface of the same. An optical system of this invention may be such one as used for carrying out recording only or reproducing only, or may be such one as used for carrying out both of recording and reproducing. Further, it may be such one as used for recording for a certain information recording medium and used for carrying out reproducing for some other information recording medium, or may be such one as used for carrying out recording or reproducing for a certain information recording medium and carrying out recording and reproducing for some other information recording medium. In addition, "reproducing" as mentioned herein includes merely reading information.

"A required numerical aperture" in this application desirably means a numerical aperture which is required for enabling reproducing or recording of information on an optical information recording medium with a light flux having a specified wavelength in an optical pickup device, but it is also possible to regard a numerical aperture which is determined by a standard of each of optical information recording media as a required numerical aperture.

An optical pickup device of this invention can be provided in a player or a drive which is compatible to optical information recording media such as a CD, a CD-R, a CD-RW, a CD-Video, a CD-ROM, a DVD, a DVD-ROM, a DVD-RAM, a DVD-R, a DVD-RW, and an MD, or in a recording and/or reproducing apparatus of audio and/or image such as an AV apparatus, a personal computer, and other information terminals which have the above-mentioned player or drive built in.

BRIEF DESCRIPTION OF THE DRAWINGS

FIG. 9(a) is a drawing showing the spherical aberration of the objective lens in the case where a DVD-RAM is used in the example of practice 2, and FIG. 9(b) is a drawing showing the spherical aberration of the objective lens in the case where a CD-RW is used in the example of practice 2;

FIG. 12(a) is a drawing showing the profile of a spot light produced by the objective lens on the recording surface of an optical disk DVD-RAM in this example of practice, and FIG. 12(b) is a drawing showing the profile of a spot light produced by the objective lens on the recording surface of an optical disk CD-RW in this example of practice.

PREFERRED EMBODIMENT TO CONDUCT THE INVENTION

Figure 1:
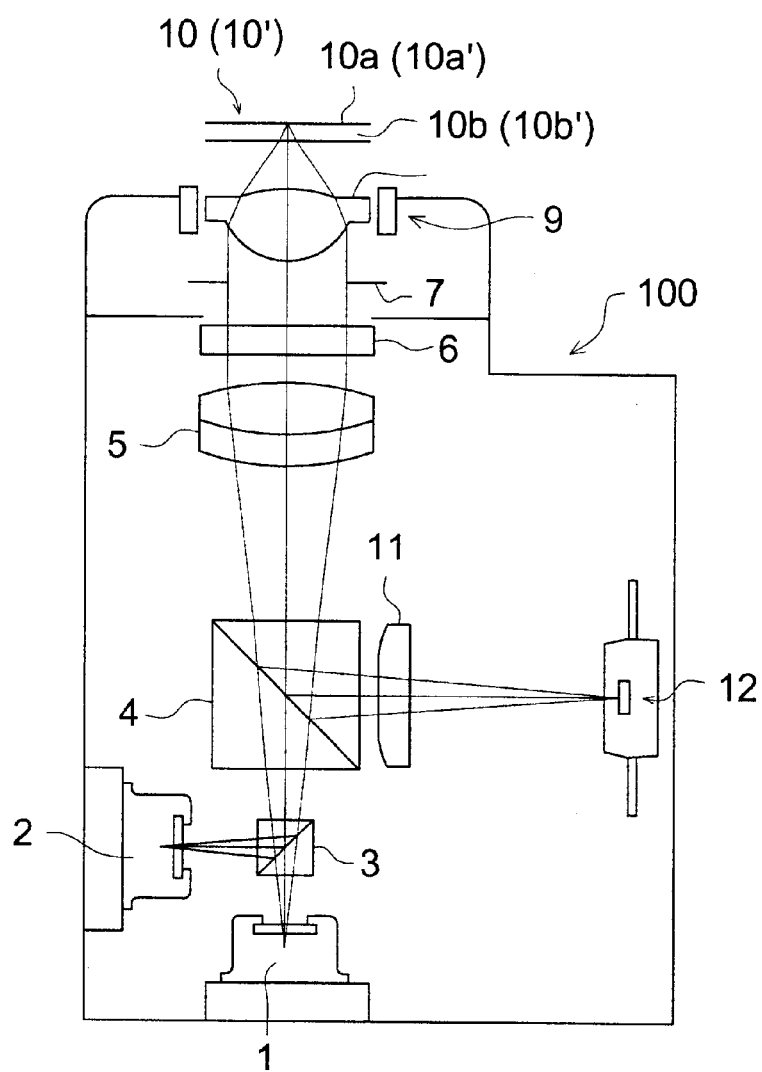
FIG. 1 is a conceptional drawing showing the structure of an optical pickup device according to this invention.

In the following, suitable embodiments of this invention will be explained by referring to the drawings.
(First Embodiment)

By referring to the drawings, the first embodiment will be explained. FIG. 1 is a drawing showing the outline of the structure of the optical pickup device 100. The optical pickup device 100 of this embodiment is one capable of carrying out the reproducing and/or recording of information for two or more kinds of optical disks having different transparent substrate thicknesses respectively. In the optical pickup device 100 of this embodiment, these plural optical disks are explained in the order from high recording density to low one as the first optical disk (DVD) having the transparent substrate thickness t1, and the second optical disk (CD) having the transparent substrate thickness t2 which is different from t1, but the optical disk is not limited to these. In this embodiment, the thicknesses of the transparent substrate t1=0.6 mm, and t2=1.2 mm, and the required numerical aperture is given by NA1=0.60 for the first optical disk, and by NA2=0.45 for the second optical disk.

The optical pickup device 100 of this embodiment comprises the first semiconductor laser 1 (the wavelength $\lambda_1$=610 nm to 670 nm) as the first light source for the first optical disk, and the second semiconductor laser 2 (the wavelength $\lambda_2$=740 nm to 870 nm) as the second light source for the second optical disk-these first light source and the second light source are selectively used in accordance with the optical disk for carrying out reproducing and/or recording. Further, the combining means 3 is a means capable of combining the light flux emitted from the first semiconductor laser 1 and the light flux emitted from the second semiconductor laser 2.

First, in the case where the information recorded in the first optical disk 10 having the transparent substrate thickness t1 is reproduced, a light flux is emitted from the first semiconductor laser, and the emitted light flux is transmitted through the combining means 3, the polarized beam splitter 4, the collimator lens 5, and the (1/4)λ plate 6, to become a circularly polarized parallel light flux. This light flux is regulated by the aperture stop 7, and is converged on the recording surface 10a through the transparent substrate 10b of the first optical disk by the objective lens 8. The light flux, which has been modulated by the information pits on the recording surface and reflected, is again transmitted through the objective lens 8, the (1/4)λ plate 6, and the collimator lens 5, to enter the polarized beam splitter 4, by which it is reflected, and is given an astigmatism by the cylindrical lens 11, to enter the light detector 12 as a light receiving element (light receiving means); by using the signal outputted from the light detector 12, it is obtained the read signal of the information recorded in the first optical disk 10.

Further, by detecting the variation of the light quantity distribution owing to the variation of the shape of the spot on the light detector 12, focusing detection and track detection are carried out. On the basis of this detection, the two-dimensional actuator 9 moves the objective lens 8 in such a way as to focus the beam from the first semiconductor laser 1 on the recording surface 10a of the first optical disk 10, as it moves the objective lens 8 in such a way as to focus the beam from the first semiconductor laser 1 on the predetermined track.

On the other hand, in the case where the information recorded in the second optical disk 10' having the transparent substrate thickness t2 (t1<t2) is reproduced, a light flux is emitted from the second semiconductor laser 2; the emitted light flux has its optical path changed by the combining means 3, and is transmitted through the polarized beam splitter 4, the collimator lens 5, the (1/4)λ plate 6, the aperture stop 7, and the objective lens 8, to be converged on the recording surface 10a' through the transparent substrate 10b of the second optical disk 10'. The light flux, which has been modulated by the information pits on the recording surface 10a' and reflected, is again transmitted through the objective lens 8, the (1/4)λ plate 6, the collimator lens 5, the polarized beam splitter 4, and the cylindrical lens 11, to enter the light detector 12, and by using the signal outputted from the light detector 12, it is obtained the read signal of the information recorded in the second optical disk 10'.

Further, by detecting the variation of the light quantity distribution owing to the variation of the shape of the spot on the light detector 12, focusing detection and track detection are carried out. On the basis of this detection, the two-dimensional actuator 9 moves the objective lens 8 in such a way as to focus the beam from the second semiconductor laser 2 on the recording surface 10a' of the second optical disk 10', as it moves the objective lens 8 in such a way as to focus the beam from the second semiconductor laser 2 on the predetermined track. When information is recorded in the first optical disk 10 or in the second optical disk 10', almost the same operation is carried out.

As described in the above, in the optical pickup device 100, when the first optical disk 10 having the transparent substrate thickness t1, for example a DVD (t1=0.6 mm), is reproduced, the objective lens 8 is moved by the two-dimensional actuator 9 in such manner as to make the beam spot form the smallest circle of confusion (the best focus).

When the second optical disk 10', for example a CD (t2=1.2 mm), which has the transparent substrate thickness t2 that is different from t1 (t2>t1) and has lower recording density than the first optical disk 10 is reproduced by using this objective lens 8, a spherical aberration is produced owing to the difference in the thickness of the transparent substrate, and at the position where the beam spot becomes the smallest circle of confusion (a position located backward from the paraxial focal point), the spot size becomes large, which makes it impossible to read (reproduce) the pit information of the second optical disk 10'.

However, at a front side position that is nearer to the objective lens 8 than the above-mentioned position of the smallest circle of confusion (before-focus position), the size of the whole spot is larger than the smallest circle of confusion, but a nucleus having light quantity concentrated at the central portion and a flare, which is unnecessary light, around the nucleus are formed. In order to utilize this nucleus for reproducing the pits of the second optical disk 10', at the time of reproducing the information recorded in the second optical disk 10', the objective lens 8 is driven by the two-dimensional actuator 9 in such a manner as to be brought into the state of defocus (before focus).

As described in the above, the optical pickup device of this embodiment is capable of converging the beams from the respective semiconductor lasers 1 and 2 on the recording surfaces 10a and 10a' of the respective optical disks 10 and 10' through the single objective lens 8.

Figure 2:
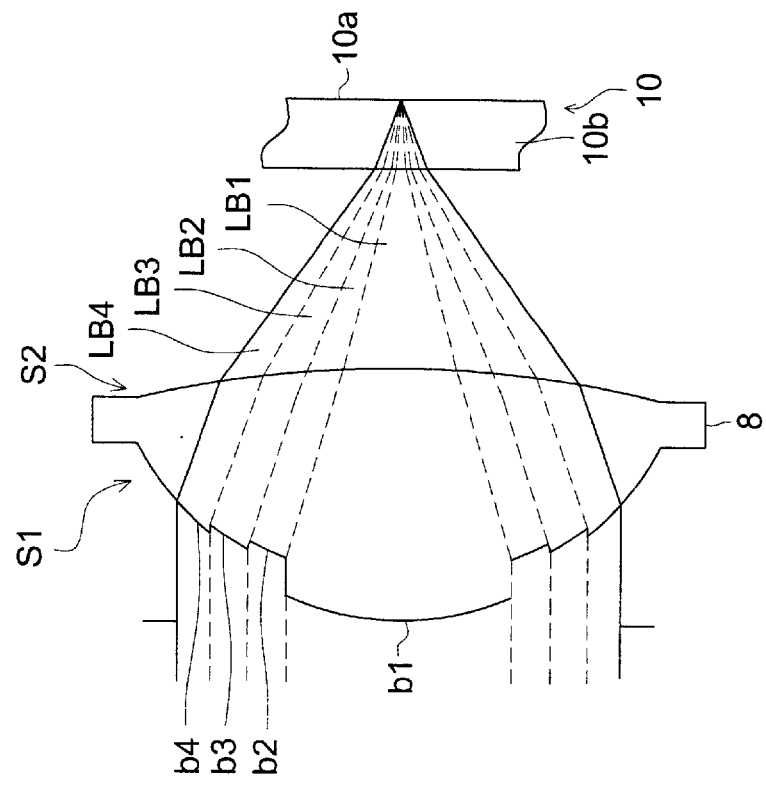
FIG. 2(a) is a cross-sectional view showing schematically the objective lens 8 used in the optical pickup device 100 of this embodiment.
FIG. 2(b) is the front view as seen from the light source side.
Figure 2:
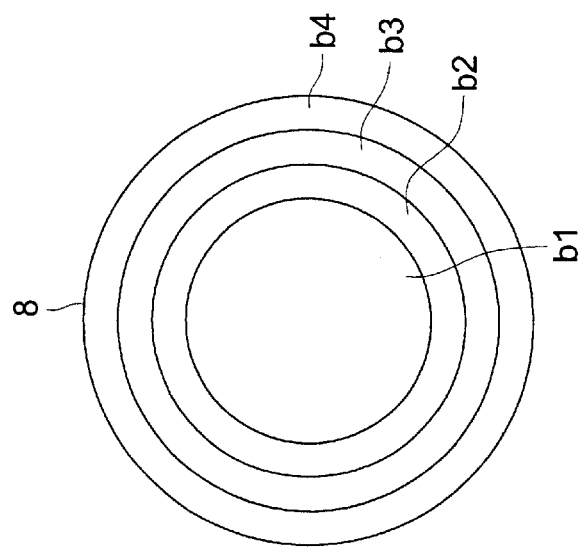

FIG. 2 comprises a cross-sectional view schematically showing the objective lens 8 for use in the optical pickup device 100 of this embodiment (a), and the front view as seen from the side of the light source (b). The single dot and dash line shows the optical axis.

This objective lens 8 is a convex lens having a positive refracting power of which the refracting surface at the light source side S1 and the refracting surface at the optical disk side S2 are both aspherical-shaped. Further, the refracting surface at the light source side S1 of the objective lens is composed of the four divisional surfaces b1 to b4 which are concentric with respect to the optical axis. At each of the borders of the divisional surfaces, a step is provided, to form each of the divisional surfaces. Accompanied by it, the spherical aberration curve and the wave front aberration curve of the objective lens have a step produced at each of the positions corresponding to the above-mentioned border portions.

In the case of a usual objective lens, it is inevitable that a spherical aberration is produced owing to the difference in the thickness of the transparent substrate between the first optical disk 10 and the second optical disk 10'. However, in the case of the objective lens 8 used in this embodiment, although a perfect correction of the spherical aberration is impossible, it is designed in such a manner as to ease this aberration more, as will be explained below.

First, in the case where reproducing or recording of information are carried out for the first optical disk-the refracting surface S1 and the refracting surface S2 are designed to be such ones as to make the spherical aberration component of the wave front aberration 0.05λ1 rms or under at the position of the best image plane. The refracting surface S1 designed in this way is applied to the first divisional surface b1 and the fourth divisional surface b4. Then, without making the above-mentioned refracting surface S2 variable, the new refracting surface S1' is designed to be such one as to make the spherical aberration component of the wave front aberration 0.05λ2 rms or under at the position of the best image plane for the transparent substrate thickness t3 (t1≦t3≦t2).

Figure 4:
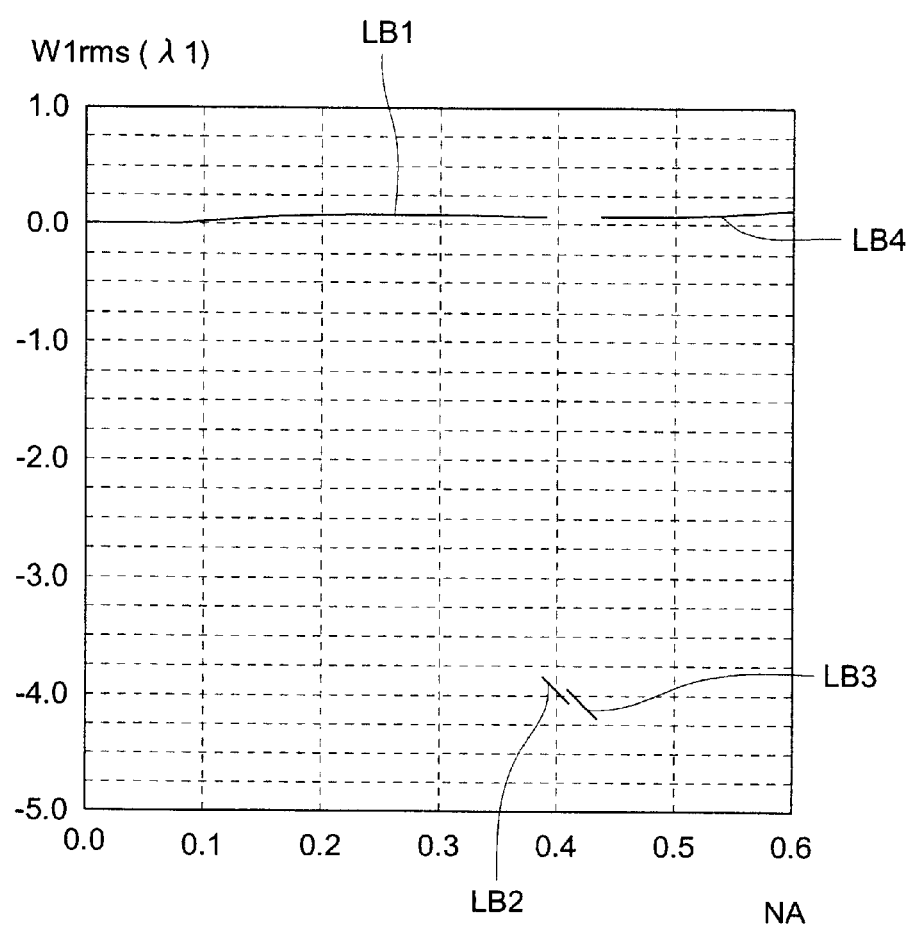
FIG. 4 is a drawing showing the wave front aberration of the objective lens in the case where a DVD is used in the example of practice 1.
Figure 5:
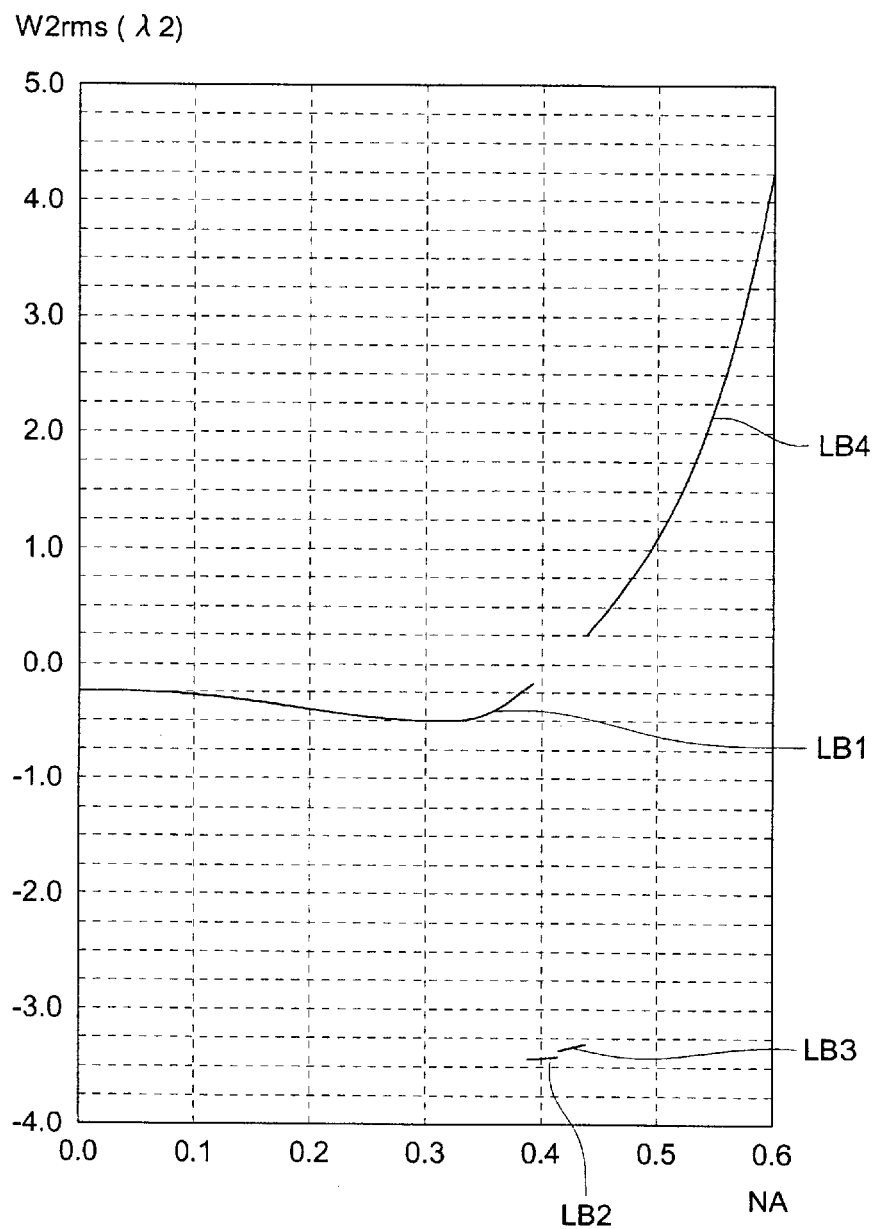
FIG. 5 is a drawing showing the wave front aberration of the objective lens in the case where a CD is used in the example of practice 1.

This refracting surface S1' is applied to the second divisional surface b2 and the third divisional surface b3; however, because the optimization is done for the transparent substrate thickness t3, the best image plane is apparently formed at a position different from the position of the best image plane formed by the first divisional surface b1 and the fourth divisional surface b4, when the first optical disk is used. However, as shown in FIG. 4 and FIG. 5, the wave front aberration has its gradient varied in the divisional surfaces, in such a way that it becomes decreasing toward right for a DVD and becomes a little increasing toward right for a CD. By providing two or more of such divisional surfaces at portions of the refracting surface S1, it becomes easy to make the wave front aberration compatible to a DVD and a CD. In this case, it is not desirable to make t3≦t1, because the gradient of the wave front aberration becomes too large for a CD. It is also not desirable to make t3≧t2 in the reverse way, because the gradient of the wave front aberration becomes too large for a DVD. If t3 is made to satisfy the condition (0.8 mm≦t3≦1.0 mm), the gradient of the wave front aberration becomes small for a DVD and for a CD.

By suitably designing the border position and the thickness on the optical axis of these divisional surfaces, at each of the position of the smallest circle of confusion of the beam spot for a DVD and the before-focus position for a CD, the correction of wave front aberration can be done. That is, for a DVD, the rays in the first to fourth light flux LB1 to LB4 converges at the position of the smallest circle of confusion, and have a wave front aberration approximately of an integral multiple of the wavelength $\lambda_1$, that is, $m_i\lambda_1$ ($m_i$ is an integer, where i=1, 2, - - - , k) at the above-mentioned position of the smallest circle of confusion.

Further, for a CD, because the required numerical aperture NA2 is smaller than NA1, it is not necessary to utilize all of the first to fourth light flux LB1 to LB4, and in the optical pickup device 100 of this embodiment, the rays in the first to third light flux LB1 to LB3 have a wave front aberration approximately of an integral multiple of the wavelength $\lambda_2$, that is, $n_i\lambda_2$ ($n_i$ is an integer, where i=1, 2, - - - , k) at the above-mentioned before-focus position. The fourth light flux LB4 is unnecessary for a CD, and on the recording surface of an optical disk, it irradiates the area at an interval from the main light spot as a flare. Because the quantity of this flare is small enough as compared to the main spot light, by merely making the aperture stop 7 equivalent to the required numerical aperture for a DVD, a CD can be reproduced without needing any means for varying the numerical aperture of the aperture stop 7.

Accordingly, in the optical pickup device 100 of this invention, although four divisional surfaces b1 to b4 are provided, a plurality of focal points are not present in the respective disks, which is different from the case of an objective lens described in the conventional technology; therefore, it is possible to reduce the loss of spot light quantity. Further, when every optical disk is used, the wave front aberration of the rays in the required numerical aperture is made approximately an integral multiple of the wavelength, and because the light flux having passed the portion inside the required numerical aperture interferes one another to make the intensity higher, which makes the central intensity of the spot light higher; as a result of it, a sufficient reflected light quantity can be obtained from the optical disk, which enables a stable operation as the interchangeable optical pickup device 100.

In addition, this invention is not to be limited to this embodiment. The first semiconductor laser 1 and the second semiconductor laser 2 are used at the same magnification m=0 in this embodiment, but this invention can be applied to the case where they are used at different magnifications respectively.

Further, the divisional surfaces are provided on the refracting surface S1 of the objective lens 8 in this embodiment, but they may be provided on another surface.

Further, the second divisional surface b2 and the third divisional surface b3 have the same aspherical shape in this embodiment, but it is of no problem to make them have different aspherical shapes respectively. Although these second and third divisional surfaces b2 and b3 are designed to have a small residual aberration for the transparent substrate thickness t3 (t1≦t3≦t2) in this embodiment for convenience' sake, it is possible not to use this method, but it is necessary only to make small the gradient of the wave front aberration for a DVD and for a CD as the result.

Moreover, steps are provided at the borders of the divisional surfaces in this embodiment; however, it is also appropriate that the border of one divisional surface and another divisional surface is not made stepwise, and is connected through a portion having a shape of a circular arc with a predetermined radius R. This circular arc-shaped portion may be one that is provided deliberately or it may be one that is provided unintentionally. As an example of this one provided unintentionally, it can be cited the circular arc-shaped portion at the border formed in working the mold in the case where an objective lens is formed by molding.

Further, the divisional surfaces are provided to have a shape of concentric rings in this embodiment, but they are not limited to this shape, and it is appropriate to provide them in a shape of broken rings.

The position of the best image plane formed by the first and fourth light flux in the case of using the first optical disk means the defocus position where the interference fringes of the first and fourth light flux become approximately straight, in an interference fringe measurement of the objective lens for the first optical disk supposed, with the area of the second and third light flux mask-processed. At this defocus position, for the second and third light flux, the interference fringes are not straight (apparently the position of the best image plane is different) because the optimization has been made for the transparent substrate thickness t3, but the areas where the wave front aberration becomes nearly an integral multiple of the wavelength increase. By such a design, the peak intensity of the spot light can be raised.

Up to now, the explanation has been done concerning the reproduction of the pits recorded in an optical disk, but things are the same in the case where information is recorded in an optical disk, in the point that the light spot converged by the converging optical system is important.

Further, it is desirable that the first light flux to (k−1)th light flux are used for the recording and/or reproducing of the first optical information recording medium and the second optical information recording medium, and the k-th light flux is used for the recording or reproducing of the first optical information recording medium; or it is desirable that the light flux passing the portion inside the required numerical aperture for the second optical information recording medium among the first light flux to the k-th light flux are used for the recording and/or reproducing of the first optical information recording medium and the second optical information recording medium, and it is desirable that the light flux passing the portion larger than the required numerical aperture for the second optical information recording medium are used for the recording and/or reproducing of the first optical information recording medium.

Further, it is also appropriate that, in carrying out the reproducing or recording of the aforesaid first optical information recording medium, with respect to the ring-shaped divisional surface which at least two pieces of light flux among the second bundle to the (k−1)th bundle having the first wavelength pass, said two pieces of light flux forming the apparent best image plane at a position different from the position of the best image plane formed by the first and k-th light flux, the depth of the step of the ring-shaped divisional surface at the side toward the optical axis is different from the depth of its step at the side reverse to the optical axis.

Further, it is also appropriate that, in carrying out the reproducing or recording of the first optical information recording medium, with respect to the ring-shaped divisional surface which at least two pieces of light flux among the second to the (k−1)th light flux having the first wavelength pass, said two pieces of light flux forming the apparent best image plane at a position different from the position of the best image plane formed by the first and k-th light flux, the shape of the aspherical surface is different from the shape of the aspherical surface of the other ring-shaped divisional surfaces.

Further, it is desirable that, in carrying out the reproducing or recording of the second optical information recording medium, the light flux passing the larger portion than the required numerical aperture for the second optical information recording medium has a larger wave front aberration than $0.07\lambda_2$ rms, more desirably $0.1\lambda_2$ rms, or further more desirably $0.2\lambda_2$ rms on the second optical information recording surface. Further, it is desirable that, in carrying out the reproducing or recording of the second optical information recording medium, the light flux passing the required numerical aperture for the second optical information recording medium have a smaller spherical aberration than 10 μm on the second information recording surface, and the light flux passing the required numerical aperture for the first optical information recording medium have a larger spherical aberration than 20 μm on the second information recording surface. It is more desirable that the light flux passing the required numerical aperture for the second optical information recording medium have a smaller spherical aberration than 5 μm on the second information recording surface, and the light flux passing the required numerical aperture for the first optical information recording medium have a larger spherical aberration than 50 μm on the second information recording surface.

Further, it is desirable that the ring-shaped divisional surface which at least two pieces of light flux among the second bundle to the (k−1)th bundle having the first wavelength pass, said two pieces of light flux forming the apparent best image plane at a position different from the position of the best image plane formed by the first and k-th light flux, has a strong refracting power.

n addition, it is desirable that the difference of the wavelength between the light flux having the first wavelength from the first light source and the light flux having the second wavelength from the second light source is 80 nm or over.

Besides, an apparatus for reproducing and/or recording optical information of this invention comprises an optical pickup device of this invention. Further, it is desirable that the apparatus comprises a spindle motor.

In the following, examples of practice will be explained.

EXAMPLE OF PRACTICE 1

This example of practice is an example of practice in the above-mentioned first embodiment. By using a DVD (the transparent substrate thickness t1=0.6 mm) for the first optical disk 10, recording or reproducing of information is carried out with the wavelength $\lambda_1$=650 nm of the first semiconductor laser 1, and by using a CD (the transparent substrate thickness t2=1.2 mm) for the second optical disk 10', recording or reproducing of information is carried out with the wavelength 2=780 nm of the second semiconductor laser 2. For each of the disks 10 and 10', the magnification of the objective lens 8 is given by m=0.

The lens data and the data of the aspherical surface are shown in Table 2 and in Table 3 respectively.

TABLE 2

| Surface | | DVD (Wavelength used: 650 nm) | | CD (Wavelength used: 780 nm) | |
|---|---|---|---|---|---|
| | r | d | n | d' | n' |
| 0 | | ∞ | 1.0 | ∞ | 1.0 |
| 1 (Aperture stop) | ∞ | 0.0 | 1.0 | 0.0 | 1.0 |
| 2 (Objective lens) | 2.122 | 2.2 | 1.5407 | 2.2 | 1.5367 |
| 3 | −8.037 | 1.7598 | 1.0 | 1.3844 | 1.0 |
| 4 (Optical disk) | ∞ | 0.6 | 1.58 | 1.2 | 1.55 |
| 5 | ∞ | | | | |

TABLE 3

| Second surface (Refracting surface S1) | First divisional surface d = 2.2 mm (0 = h < 1.321 mm) | κ = −0.5728<br>A1 = −0.84047 × 10⁻³  P1 = 3.0<br>A2 = −0.33071 × 10⁻²  P2 = 4.0<br>A3 = +0.12806 × 10⁻¹  P3 = 5.0<br>A4 = −0.13746 × 10⁻¹  P4 = 6.0<br>A5 = +0.69442 × 10⁻²  P5 = 7.0<br>A6 = −0.14889 × 10⁻²  P6 = 8.0<br>A7 = +0.21910 × 10⁻⁴  P7 = 10.0 |
|---|---|---|
| | Second divisional surface d = 2.1956 mm (1.321 mm = h < 1.401 mm) | κ = −0.55945<br>A1 = −0.14651 × 10⁻²  P1 = 3.0<br>A2 = −0.30141 × 10⁻²  P2 = 4.0<br>A3 = +0.12994 × 10⁻¹  P3 = 5.0<br>A4 = −0.13711 × 10⁻¹  P4 = 6.0<br>A5 = +0.69174 × 10⁻²  P5 = 7.0<br>A6 = −0.15181 × 10⁻²  P6 = 8.0<br>A7 = +0.26810 × 10⁻⁴  P7 = 10.0 |
| | Third divisional surface d = 2.1957 mm (1.401 mm = h < 1.481 mm) | κ = −0.55945<br>A1 = −0.14651 × 10⁻²  P1 = 3.0<br>A2 = −0.30141 × 10⁻²  P2 = 4.0<br>A3 = +0.12994 × 10⁻¹  P3 = 5.0<br>A4 = −0.13711 × 10⁻¹  P4 = 6.0<br>A5 = −0.69174 × 10⁻²  P5 = 7.0<br>A6 = −0.15181 × 10⁻²  P6 = 8.0<br>A7 = +0.26810 × 10⁻⁴  P7 = 10.0 |
| | Fourth divisional surface d = 2.2 mm (1.481 mm = h < 2.02 mm) | κ = −0.5728<br>A1 = −0.84047 × 10⁻³  P1 = 3.0<br>A2 = −0.33071 × 10⁻²  P2 = 4.0<br>A3 = +0.12806 × 10⁻¹  P3 = 5.0<br>A4 = −0.13746 × 10⁻¹  P4 = 6.0<br>A5 = +0.69442 × 10⁻²  P5 = 7.0<br>A6 = −0.14889 × 10⁻²  P6 = 8.0<br>A7 = +0.21910 × 10⁻⁴  P7 = 10.0 |
| Third surface (Refracting surface S2) | | κ = −0.23180 × 10⁺²<br>A1 = −0.25183 × 10⁻²  P1 = 3.0<br>A2 = +0.99607 × 10⁻²  P2 = 4.0<br>A3 = −0.46369 × 10⁻²  P3 = 5.0<br>A4 = +0.71713 × 10⁻²  P4 = 6.0<br>A5 = −0.11226 × 10⁻³  P5 = 7.0<br>A6 = +0.12961 × 10⁻²  P6 = 8.0<br>A7 = −0.10768 × 10⁻³  P7 = 10.0 |

Figure 6:
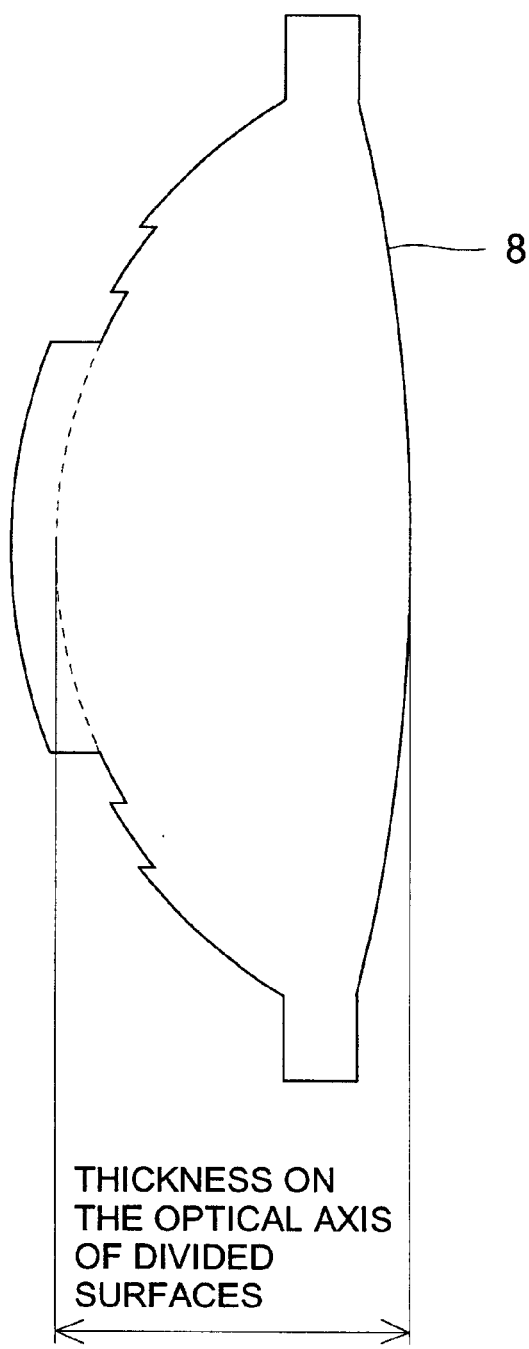
FIG. 6 is a drawing showing the thickness on the optical axis of a divisional surface of an objective lens.

In addition, in Table 2, with the light emitting point of the semiconductor laser 1 made the zeroth surface, ith surface is shown in the consecutive order in accordance with the light progressing direction up to the information recording surface 10a of the optical disk 10. However, the cover glass of the semiconductor laser 1, the polarized beam splitter 4, the collimator lens 5, and the (1/4)λ plate 6 are omitted. Moreover, r denotes the radius of curvature of the surfaces, d denotes the space between the I-th surface and the (i+1)th surface, and n denotes the refractive index. The first surface is the aperture stop 7, and when a DVD or a CD is used, the diameter of the aperture φ is equal to 4.04 mm for either. Further, as shown in FIG. 6, the surface interval for the divisional surfaces (the thickness on the optical axis of the divisional surfaces described in the above table) is shown as the interval on the optical axis between the intersecting point of each of the divisional surfaces, which is extended to the optical axis in accordance with the expression of the aspherical surface shape, with the optical axis and the third surface. Each of the divisional surfaces is formed by the concentric circles about the optical axis, and its area is defined by the distance h from the optical axis.

The expression of the aspherical surface is based on the following formula [M1]:

$$X = \frac{H^2/r}{1 + \sqrt{1 - (1+\kappa)(H/r)^2}} + \sum_j A_j H^{P_j}$$

where X denotes an axis in the direction of the optical axis, H denotes an axis perpendicular to the optical axis, the progressing direction of light is taken positive, K denotes the coefficient of cone, Aj denotes the coefficient of aspherical surface, and Pj denotes the number of power of the aspherical surface.

For the objective lens 8, first, the refracting surface S1 and the refracting surface S2 are designed to be such one as to make the residual aberration small (about $0.05\lambda_1$ rms or under is suitable) in the case of using a DVD. The refracting surface SI is composed of the four divisional surfaces b1 to b4, and this refracting surface S1 is applied to the first divisional surface b1 and the fourth divisional surface b4. Then, with the refracting surface S2 fixed, it is designed the refracting surface S1' to make the residual aberration approximately zero in the case where the wavelength $\lambda_2$=780 nm and a virtual optical disk having the transparent substrate thickness t3=0.95 mm are used. This surface S1' is applied to the aspherical surface for the second divisional surface b2 and the third divisional surface b3.

Figure 3:
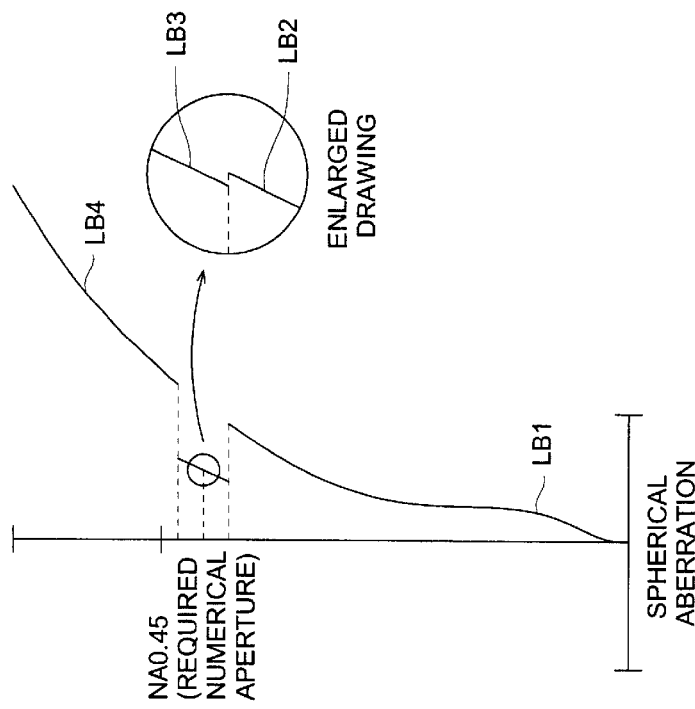
FIG. 3(a) is a drawing showing the spherical aberration of the objective lens in the case where a DVD is used in the example of practice 1.
FIG. 3(b) is a drawing showing the spherical aberration of the objective lens in the case where a CD is used in the example of practice 1.
Figure 3:
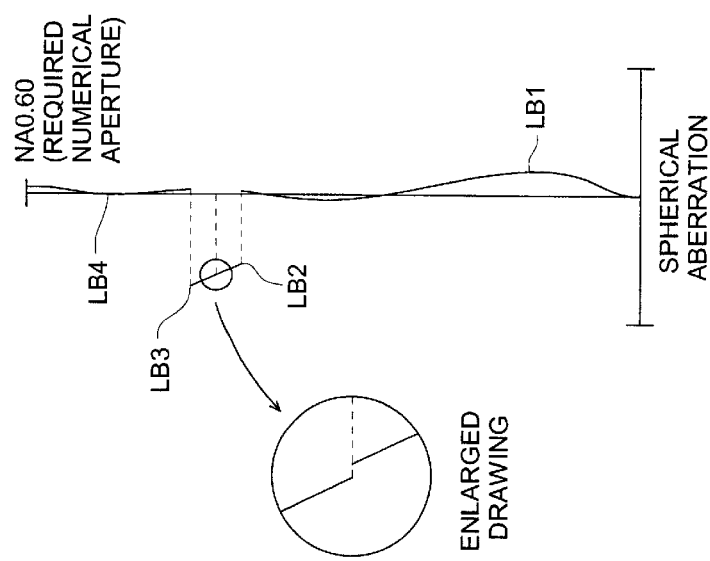

FIG. 3 shows the spherical aberration of the objective lens in this example of practice, and FIG. 4 and FIG. 5 show the wave front aberrations of the objective lens in this example of practice respectively. The second divisional surface b2 and the third divisional surface b3 have the thickness on the optical axis shifted from each other by 0.1 μm, and the amount of stepwise difference in the aberration curve at the pertinent positions is more remarkable for the wave front aberration as compared to the spherical aberration; the aim of the design is to broaden the area where the wave front aberration is approximately an integral multiple of the wavelength used. Assuming that the thickness on the optical axis of the third divisional surface is the same as that of the second divisional surface, it increases the area where the wave front aberration of the third divisional surface b3 deviates from $-4\lambda_1$ rms, and as a result of it, the central intensity of the spot light for a DVD is reduced by 4.1% as compared to this example of practice. In this example of practice, as it is clearly observed in FIG. 4 and FIG. 5, the approximate integers $m_i$ and $n_i$ for the wave front aberration of the respective divisional surfaces are such as shown in Table 4.

TABLE 4

|  | $m_1$ (DVD) | $n_1$ (CD) |
|---|---|---|
| First divisional surface | $m_1 = 0$ | $n_1 = 0$ |
| Second divisional surface | $m_2 = -4$ | $n_2 = -3$ |
| Third divisional surface | $m_3 = -4$ | $n_3 = -3$ |
| Fourth divisional surface | $m_4 = 0$ |  |

Figure 7:
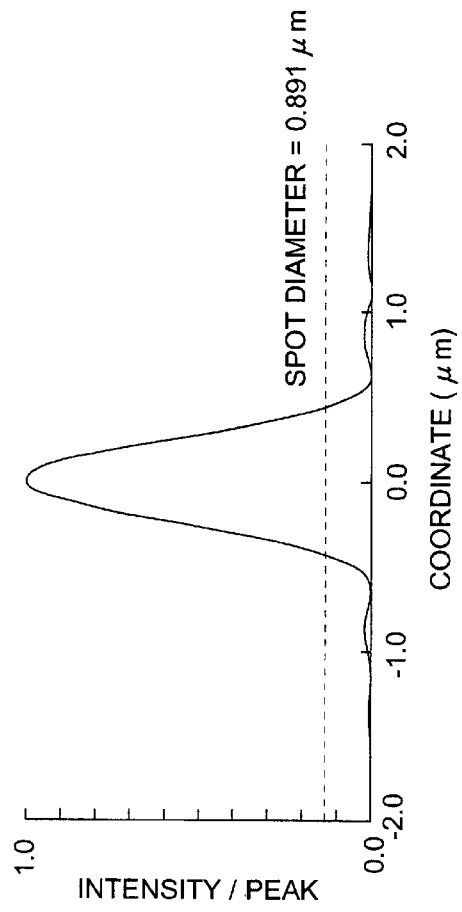
FIG. 7(a) is a drawing showing the profile of a spot light produced by the objective lens on the recording surface of an optical disk DVD in this example of practice.
FIG. 7(b) is a drawing showing the profile of a spot light produced by the objective lens on the recording surface of an optical disk CD in this example of practice.
Figure 7:
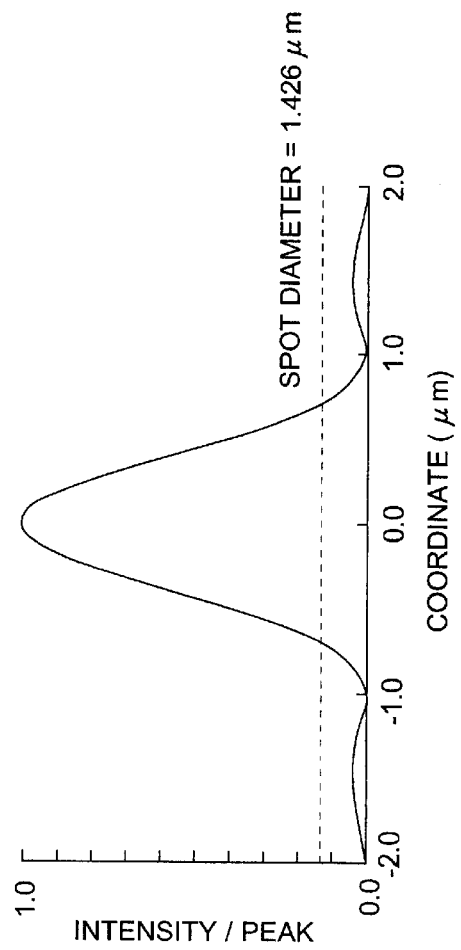

FIG. 7 shows the spot light profiles of the objective lens in this example of practice on the recording surface of the respective optical disks, and it can be confirmed that the objective lens is compatible to the spot sizes required for the respective media.

(Second Embodiment)

In the following, the second embodiment will be explained. An optical pickup device of this embodiment is similar to the above-mentioned one aside from the point that there are six divisional surfaces formed on the refracting surface S1 of the objective lens 18; therefore, explanation of the overlapping portions will be omitted, and only the objective lens 18 will be explained in detail.

The optical pickup device of this embodiment can carry out recording and/or reproducing of information for two or more kinds of optical disks. In this embodiment, these plural optical disks will be explained in the order from high recording density to low one, as the first optical disk (a DVD-RAM) having the transparent substrate thickness t1 and the second optical disk (a CD-RW) having the transparent substrate thickness t2 which is different from t1. In this embodiment, the transparent substrate thicknesses t1=0.6 mm and t2=1.2 mm, and the required numerical apertures are given by NA1=0.65 for the first optical disk and NA2=0.50 for the second optical disk.

Figure 8B:
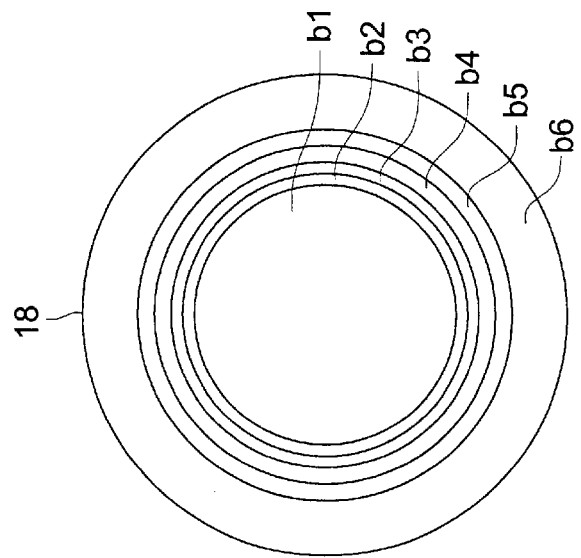
FIG. 8(b) is the front view as seen from the light source side.
Figure 8A:
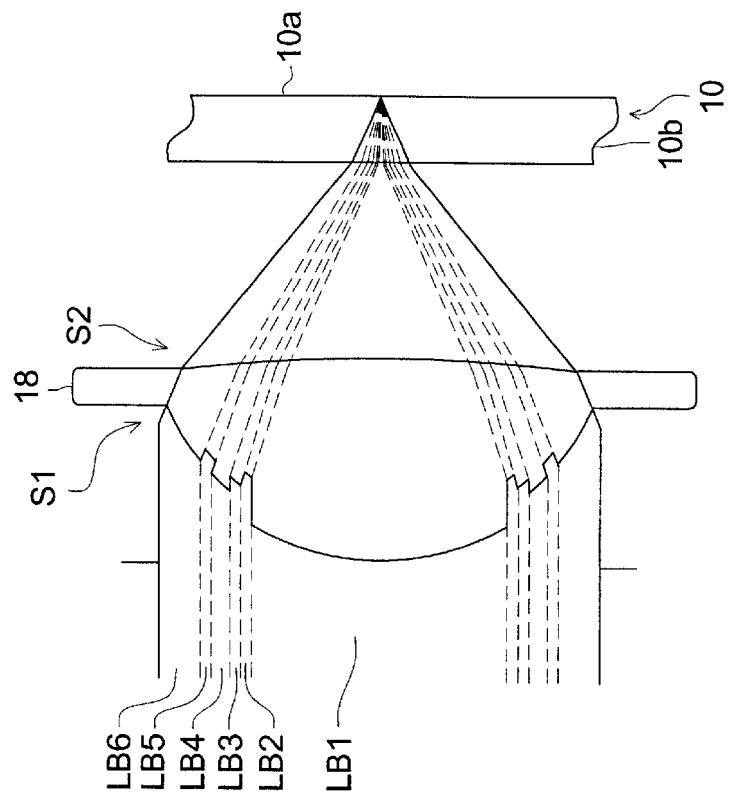
FIG. 8(a) is a cross-sectional view showing schematically the objective lens 18 according to the second embodiment.

FIG. 8 are the cross-sectional view schematically showing the objective lens 18 for use in an optical pickup device of this embodiment (a), and its front view as seen from the side of the light source (b). The single dot and dash line shows the optical axis.

This objective lens 18 is a convex lens having a positive refracting power of which the refracting surface at the light source side S1 and the refracting surface at the optical disk side S2 are both aspherical-shaped. Further, the refracting surface at the light source side S1 of the objective lens 18 is composed of the six divisional surfaces b1 to b6 which are concentric with respect to the optical axis. At each of the borders of the divisional surfaces, a step is provided, to form each of the divisional surfaces. Accompanied by it, the spherical aberration curve and the wave front aberration curve of the objective lens have a step produced at each of the positions corresponding to the above-mentioned border portions.

As described in the above, in the case of a usual objective lens, it is inevitable that a spherical aberration is produced owing to the difference in the thickness of the transparent substrate between the first optical disk 10 and the second optical disk 10'. However, in the case of the objective lens 18 used in this embodiment, although a perfect correction of the spherical aberration is impossible, it is designed in such a manner as to ease this aberration, as will be explained below.

First, in the case where reproducing or recording of information are carried out for the first optical disk-the refracting surface S1 and the refracting surface S2 are designed to be such ones as to make the spherical aberration component of the wave front aberration $0.05\lambda_1$ rms or under at the position of the best image plane. The refracting surface S1 designed in this way is applied to the first divisional surface b1, the fourth divisional surface b4, and sixth divisional surface b6. Then, without letting the above-mentioned refracting surface S2 vary, the new refracting surface S1" is designed to be such one as to make the spherical aberration component of the wave front aberration $0.05\lambda_2$ rms or under at the position of the best image plane for the transparent substrate thickness t3 (t1≦t3≦t2).

Figure 10:
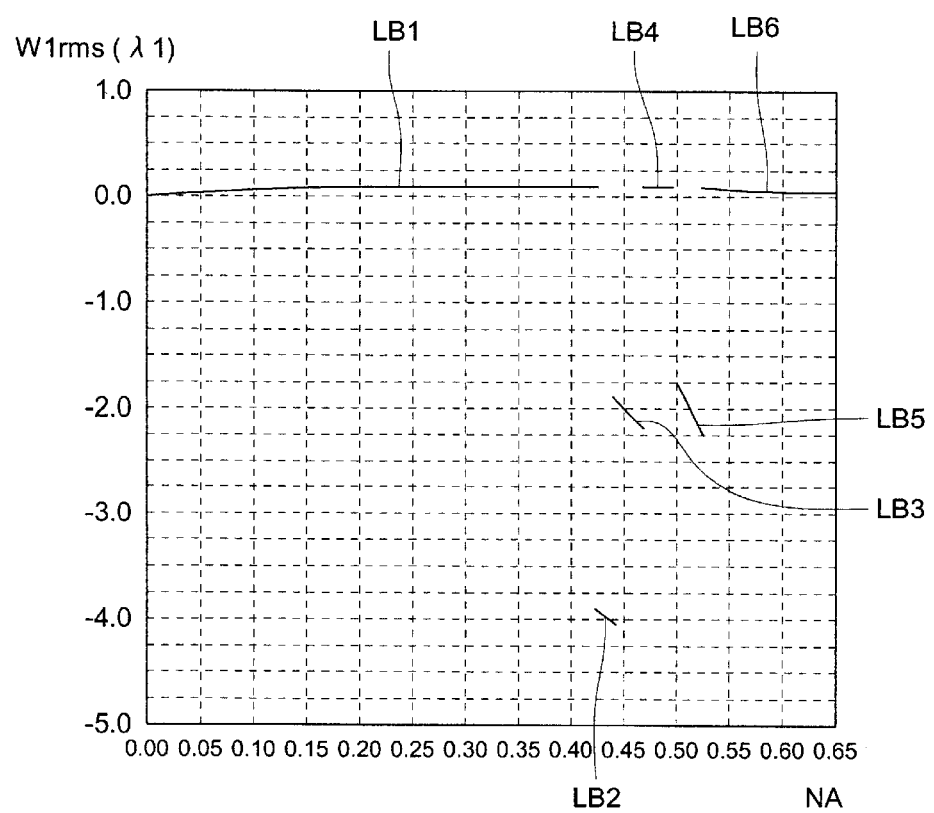
FIG. 10 is a drawing showing the wave front aberration of the objective lens in the case where a DVD-RAM is used in the example of practice 2.
Figure 11:
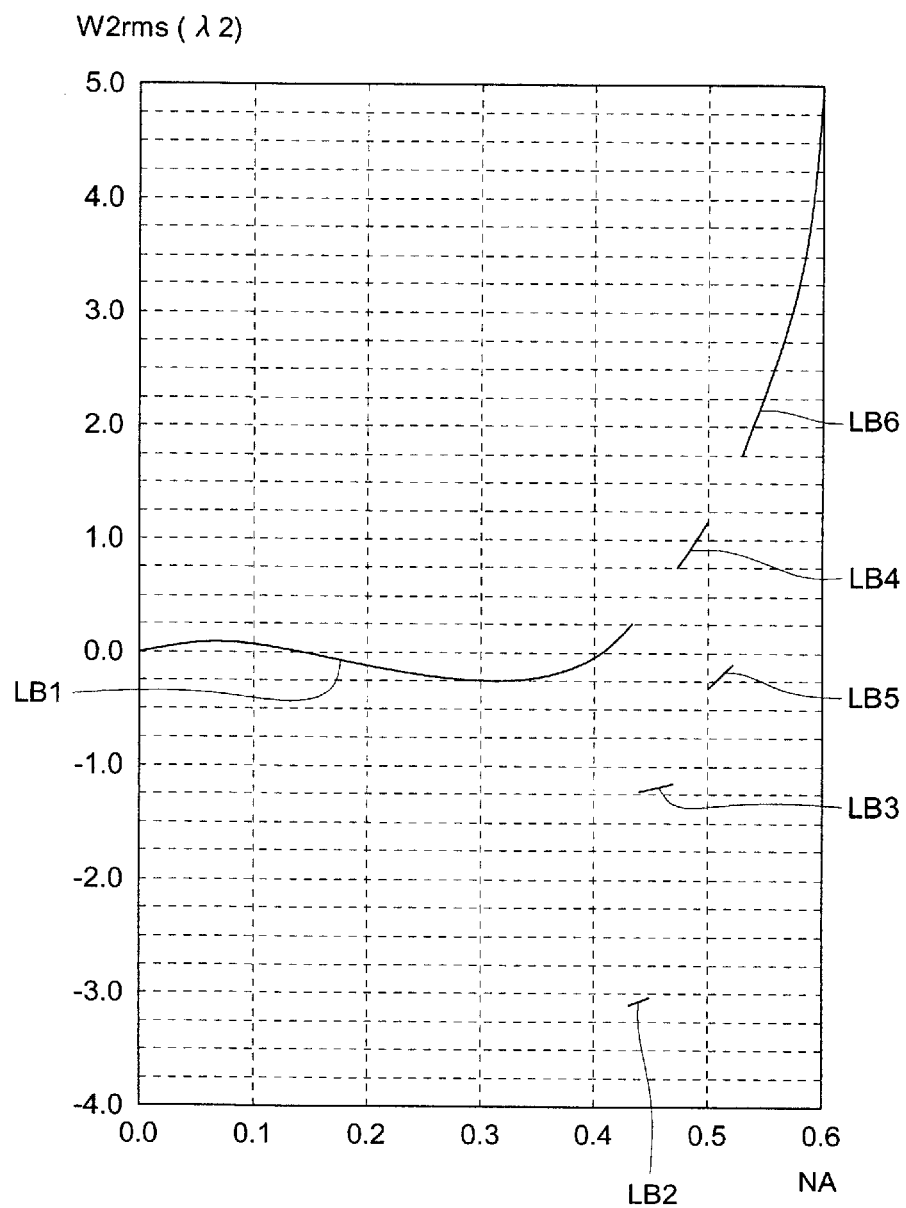
FIG. 11 is a drawing showing the wave front aberration of the objective lens in the case where a CD-RW is used in the example of practice 2.

This refracting surface S1" is applied to the second divisional surface b2, the third divisional surface b3, and the fifth divisional surface b5; however, because the optimization is done for the transparent substrate thickness t3, the best image plane is apparently formed at a position different from the position of the best image plane formed by the first divisional surface b1, the fourth divisional surface b4, and the sixth divisional surface b6, when the first optical disk is used. However, as shown in FIG. 10 and FIG. 11, the wave front aberration has its gradient varied in the divisional surfaces, in such a way that it becomes decreasing toward right for a DVD-RAM and becomes a little increasing toward right for a CD in the reverse way. By providing two or more of such divisional surfaces at portions of the refracting surface SI, it becomes easy to make the wave front aberration compatible to a DVD-RAM and a CD-RW.

In this case, it is not desirable to make t3≦t1, because the gradient of the wave front aberration becomes too large for a CD-RW. It is also not desirable to make t3≧t2 in the reverse way, because the gradient of the wave front aberration becomes too large for a DVD-RAM. If t3 is desirably made to satisfy the condition (0.8 mm≦t3≦1.0 mm), the gradient of the wave front aberration can be made small for a DVD-RAM and for a CD-RW.

By suitably designing the border position and the thickness on the optical axis of each of these divisional surfaces, at each of the position of the smallest circle of confusion of the beam spot for a DVD-RAM and the before-focus position for a CD-RW, the correction of wave front aberration can be done. That is, for a DVD-RAM, the rays in the first to sixth light flux LB1 to LB6 are converged at the position of the smallest circle of confusion by the objective lens, and have a wave front aberration approximately of an integral multiple of the wavelength $\lambda_1$ at the above-mentioned position of the smallest circle of confusion.

Further, for a CD-RW, because the required numerical aperture NA2 is smaller than NA1, it is not necessary to effectively utilize all of the first to sixth light flux LB1 to LB6, and in the optical pickup device of this embodiment, the rays in the first to fifth light flux LB1 to LB5 have a wave front aberration approximately of an integral multiple of the wavelength $\lambda_2$ at the above-mentioned before-focus position.

In this way, the wave front aberration of the rays inside the required numerical aperture is made approximately an integral multiple of the wavelength, which raises the energy of the nucleus of the beam spot, and as the result of it, a sufficient quantity of the reflected light can be obtained from the optical disk, which enables a stable operation for the optical pickup device.

In addition, this invention is not to be limited to this embodiment. The first semiconductor laser 1 and the second semiconductor laser 2 are used at the same magnification m=0, but this invention can be applied to the case where they are used at different magnifications respectively.

Further, the divisional surfaces are provided on the refracting surface S1 of the objective lens 18; however, this invention is not limited to this, and it is possible to provide them on an optical element in the other converging optical system, or it is also possible to provide a separate optical element.

Further, the second divisional surface, the third divisional surface, and the fifth divisional surface have the same aspherical shape in this embodiment, but it is of no problem to make them have different aspherical shapes respectively.

Further, a step is provided at each of the borders of the divisional surfaces in this embodiment; however it is also possible that the border of one divisional surface and another divisional surface is not made stepwise and is connected through a portion having a shape of a circular arc with a predetermined radius R. This circular arc-shaped portion may be one that is provided deliberately or it may be one that is provided unintentionally. As an example of this one provided unintentionally, it can be cited the circular arc-shaped portion at the border formed in working the mold in the case where an objective lens is formed by molding.

Moreover, the divisional surfaces are provided to have a shape of concentric rings in this embodiment, but they are not limited to this shape, and it is appropriate to provide them in a shape of broken rings.

Up to now, the explanation has been done concerning the reproduction of the pits recorded in an optical disk, but things are the same in the case where information is recorded in an optical disk, in the point that the light spot converged by the converging optical system is important.

EXAMPLE OF PRACTICE 2

This example of practice is an example of practice in the above-mentioned second embodiment. By using a DVD-RAM (the transparent substrate thickness t1=0.6 mm) for the first optical disk 10, recording or reproducing of information is carried out with the wavelength $\lambda_1$=650 nm of the first semiconductor laser 1, and by using a CD-RW (the transparent substrate thickness t2=1.2 mm) for the second optical disk 10', reproducing or recording of information is carried out with the wavelength 2=780 nm of the second semiconductor laser 2. For each of the disks 10 and 10', the magnification of the objective lens 8 is given by m=0.

The lens data and the data of the aspherical surface are shown in Table 5 and in Table 6 respectively.

TABLE 5

| | | DVD-RAM (Wavelength used: 650 nm) | | CD-RW (Wavelength used: 780 nm) | |
|---|---|---|---|---|---|
| Surface | r | d | n | d' | n' |
| 0 | | ∞ | 1.0 | ∞ | 1.0 |
| 1 (Aperture stop) | ∞ | 0.0 | 1.0 | 0.0 | 1.0 |
| 2 (Objective lens) | 1.968 | 1.7 | 1.58038 | 1.7 | 1.57645 |
| 3 | −12.031 | 1.703 | 1.0 | 1.326 | 1.0 |
| 4 (Optical disk) | ∞ | 0.6 | 1.58 | 1.2 | 1.55 |
| 5 | ∞ | | | | |

TABLE 6

| | | | |
|---|---|---|---|
| Second surface (Refracting surface S1) | First divisional surface<br>d = 1.7 mm<br>(0 = h < 1.299 mm) | $\kappa = -0.80900$<br>$A1 = -0.25510 \times 10^{-2}$<br>$A2 = -0.69027 \times 10^{-4}$<br>$A3 = +0.28185 \times 10^{-1}$<br>$A4 = -0.37075 \times 10^{-1}$<br>$A5 = +0.22458 \times 10^{-1}$<br>$A6 = -0.55693 \times 10^{-2}$<br>$A7 = +0.17221 \times 10^{-3}$ | $P1 = 3.0$<br>$P2 = 4.0$<br>$P3 = 5.0$<br>$P4 = 6.0$<br>$P5 = 7.0$<br>$P6 = 8.0$<br>$P7 = 10.0$ |
| | Second divisional surface<br>d = 1.6960 mm<br>(1.299 mm = h < 1.355 mm) | $\kappa = -0.78918$<br>$A1 = -0.33288 \times 10^{-2}$<br>$A2 = +0.39927 \times 10^{-3}$<br>$A3 = +0.28395 \times 10^{-1}$<br>$A4 = -0.37082 \times 10^{-1}$<br>$A5 = +0.22400 \times 10^{-1}$<br>$A6 = -0.56039 \times 10^{-2}$<br>$A7 = +0.18417 \times 10^{-3}$ | $P1 = 3.0$<br>$P2 = 4.0$<br>$P3 = 5.0$<br>$P4 = 6.0$<br>$P5 = 7.0$<br>$P6 = 8.0$<br>$P7 = 10.0$ |
| | Third divisional surface<br>d = 1.6987 mm<br>(1.355 mm = h < 1.438 mm) | $\kappa = -0.78918$<br>$A1 = -0.33288 \times 10^{-2}$<br>$A2 = +0.39927 \times 10^{-3}$<br>$A3 = +0.28395 \times 10^{-1}$<br>$A4 = -0.37082 \times 10^{-1}$<br>$A5 = +0.22400 \times 10^{-1}$<br>$A6 = -0.56039 \times 10^{-2}$<br>$A7 = +0.18417 \times 10^{-3}$ | $P1 = 3.0$<br>$P2 = 4.0$<br>$P3 = 5.0$<br>$P4 = 6.0$<br>$P5 = 7.0$<br>$P6 = 8.0$<br>$P7 = 10.0$ |
| | Fourth divisional surface;<br>d = 1.7 mm<br>(1.438 mm = h < 1.520 mm) | $\kappa = -0.80900$<br>$A1 = -0.25510 \times 10^{-2}$<br>$A2 = -0.69027 \times 10^{-4}$<br>$A3 = +0.28185 \times 10^{-1}$<br>$A4 = -0.37075 \times 10^{-1}$<br>$A5 = +0.22458 \times 10^{-1}$<br>$A6 = -0.55693 \times 10^{-2}$<br>$A7 = +0.17221 \times 10^{-3}$ | $P1 = 3.0$<br>$P2 = 4.0$<br>$P3 = 5.0$<br>$P4 = 6.0$<br>$P5 = 7.0$<br>$P6 = 8.0$<br>$P7 = 10.0$ |
| | Fifth divisional surface<br>d = 1.6998 mm<br>(1.520 × h < 1.612 mm) | $\kappa = -0.78918$<br>$A1 = -0.33288 \times 10^{-2}$<br>$A2 = +0.39927 \times 10^{-3}$<br>$A3 = +0.28395 \times 10^{-1}$<br>$A4 = -0.37082 \times 10^{-1}$<br>$A5 = +0.22400 \times 10^{-1}$<br>$A6 = -0.56039 \times 10^{-2}$<br>$A7 = +0.18417 \times 10^{-3}$ | $P1 = 3.0$<br>$P2 = 4.0$<br>$P3 = 5.0$<br>$P4 = 6.0$<br>$P5 = 7.0$<br>$P6 = 8.0$<br>$P7 = 10.0$ |
| | Sixth divisional surface<br>d = 1.7 mm<br>(1.612 mm = h < 1.98 mm) | $\kappa = -0.80900$<br>$A1 = -0.25510 \times 10^{-2}$<br>$A2 = -0.69027 \times 10^{-4}$<br>$A3 = +0.28185 \times 10^{-1}$<br>$A4 = -0.37075 \times 10^{-1}$<br>$A5 = +0.22458 \times 10^{-1}$<br>$A6 = -0.55693 \times 10^{-2}$<br>$A7 = +0.17221 \times 10^{-3}$ | $P1 = 3.0$<br>$P2 = 4.0$<br>$P3 = 5.0$<br>$P4 = 6.0$<br>$P5 = 7.0$<br>$P6 = 8.0$<br>$P7 = 10.0$ |
| Third surface (Refracting surface S2) | | $\kappa = -0.60242$<br>$A1 = -0.98102 \times 10^{-2}$<br>$A2 = +0.35477 \times 10^{-1}$<br>$A3 = -0.27983 \times 10^{-1}$<br>$A4 = +0.84072 \times 10^{-2}$<br>$A5 = +0.15107 \times 10^{-2}$<br>$A6 = -0.12596 \times 10^{-2}$<br>$A7 = +0.66113 \times 10^{-4}$ | $P1 = 3.0$<br>$P2 = 4.0$<br>$P3 = 5.0$<br>$P4 = 6.0$<br>$P5 = 7.0$<br>$P6 = 8.0$<br>$P7 = 10.0$ |

In addition, in Table 5, with the light emitting point of the semiconductor lasers 1 and 2 made the zeroth surface, i-th surface is shown in the consecutive order in accordance with the light progressing direction up to the information recording surface of the optical disks 10 and 10'. However, the cover glass of the semiconductor lasers 1 and 2, the polarized beam splitter 4, the collimator lens 5, and the (1/4)λ plate 6 are omitted. Moreover, r denotes the radius of curvature of the surfaces, d denotes the space between the i-th surface and the (i+1)th surface, and n denotes the refractive index. The first surface is the aperture stop 7, and when a DVD-RAM or a CD-RW is used, the diameter of the aperture φ is equal to 3.97 mm for either. Further, as shown in FIG. 6, the surface interval for the divisional surfaces (the thickness on the optical axis of the divisional surfaces described in the above table) is shown as the interval on the optical axis between the intersecting point of each of the divisional surfaces, which is extended to the optical axis in accordance with the expression of the aspherical surface shape, with the optical axis and the third surface. Each of the divisional surfaces is formed by the concentric circles about the optical axis, and its area is defined by the distance h from the optical axis.

The expression of the aspherical surface is based on the above-mentioned formula [M1], where X denotes an axis in the direction of the optical axis, H denotes an axis perpendicular to the optical axis, the progressing direction of light is taken positive, κ denotes the coefficient of cone, Aj denotes the coefficient of aspherical surface, and Pj denotes the number of power of the aspherical surface.

For the objective lens 18, first, the refracting surface S1 and the refracting surface S2 are designed to be such one as to make the residual aberration small in the case of using a DVD-RAM. The refracting surface S1 is composed of the six divisional surfaces b1 to b6, and this refracting surface S1 is applied to the first divisional surface b1, the fourth divisional surface b4, and the sixth divisional surface b6. Then, with the refracting surface S2 fixed, it is designed the refracting surface S1' to make the residual aberration approximately zero in the case where the wavelength 2=780 nm and a virtual optical disk having the transparent substrate thickness t3=0.90 mm are used. This surface S1, is applied to the aspherical surface for the second divisional surface b2, the third divisional surface b3, and the fifth divisional surface b5.

FIG. 9 shows the spherical aberration of the objective lens 18 in this example of practice, and FIG. 10 and FIG. 11 show the wave front aberrations of the objective lens 18 in this example of practice respectively. Because the required numerical aperture for the CD-RW is given by NA2=0.50, in FIG. 11, the wave front aberration is shown with the part in which the numerical aperture is 0.60 or larger omitted. By suitably designing the thicknesses on the optical axis of the second divisional surface b2, the third divisional surface b3, and the fifth divisional surface b5, it is made broad the area where the wave front aberration becomes approximately an integral multiple of the wavelength. In this example of practice, as it is clearly observed in FIG. 10 and FIG. 11, the approximate integers $m_i$ and $n_i$ for the wave front aberration of the respective divisional surfaces are such as shown in Table 7.

TABLE 7

|  | $m_1$ (DVD) | $n_1$ (CD) |
|---|---|---|
| First divisional surface | $m_1 = 0$ | $n_1 = 0$ |
| Second divisional surface | $m_2 = 4$ | $n_2 = -3$ |
| Third divisional surface | $m_3 = -2$ | $n_3 = -1$ |

TABLE 7-continued

|  | $m_1$ (DVD) | $n_1$ (CD) |
|---|---|---|
| Fourth divisional surface | $m_4 = 0$ | $n_4 = 1$ |
| Fifth divisional surface | $m_5 = -2$ | $n_5 = 0$ |
| Sixth divisional surface | $m_6 = 0$ |  |

FIG. 12 shows the spot light profiles of the objective lens 18 in this example of practice on the recording surface of the respective optical disks, and it can be confirmed that the objective lens is compatible to the spot sizes required for the respective media.

In addition, in this invention, the divisional surfaces are provided on the objective lens, but it is also possible to provide them on a lens in other converging optical system (for example, a coupling lens for converting the angle of divergence of the light flux such as a collimator lens which makes a divergent light flux from a light source approximately a parallel light flux). In other way, it is also possible to provide them on another optical element such as a diffraction element or a prism, or to arrange in the optical path an optical element provided with them.

Availability to the Industry

As explained in the above, according to this invention, it is possible to provide an optical pickup device and an objective lens capable of correcting the deviation of wave front aberration in the divisional surfaces inside the required numerical apertures for a plurality of optical disks. Further, it is possible to provide an optical pickup device and an objective lens having a small amount of loss of light quantity and an excellent S-letter characteristic.

What is claimed is:

1. An optical pickup device for conducting reproducing and/or recording of information in at least two kinds of optical information recording media, comprising
    a first light source to emit light flux having a first wavelength (λ1) in order to conduct reproducing and/or recording of the information in a first optical information recording medium having a first transparent substrate;
    a second light source to emit light flux having a second wavelength (λ2) longer than the first wavelength in order to conduct reproducing and/or recording of the information of a second optical information recording medium having a second transparent substrate, where the thickness of the second transparent substrate is thicker than the thickness of the first transparent substrate;
    a converging optical system for converging the light flux having the first wavelength or the light flux having the second wavelength on the first information recording surface of the first optical information recording medium or on the second information recording surface of the second optical information recording medium; and
    an optical detector for receiving and detecting the light flux reflected by the first information recording surface or by the second information recording surface,
    wherein a required numerical aperture for the first optical information recording medium is larger than that for the second optical information recording medium;
    wherein the converging optical system comprises at least one optical element and the optical element has ring-shaped divided surfaces partitioned by stepped portions on at least one surface for dividing the light flux incident on the optical element into k (k≧ 4) pieces of ring-shaped light flux in which light flux nearest to the optical axis of the optical element is regarded as the fist light flux and other light flux are called consecutively the second, the third - - - , and the k-th light flux toward the outer side in the direction perpendicular to the optical axis;

wherein when conducting reproducing or recording of the first optical information recording medium, the first light flux and the k-th light flux among the light flux of the first wavelength having passed the ring-shaped divided surfaces are converged on the first information recording surface in order to conduct reproducing or recording of the information of the first optical information recording medium, a spherical aberration component of a wave front aberration is made 0.05λ1 rms or less at a position of the best image plane, and at least two pieces of light flux among the light flux of the first wavelength from the second light flux to the (k-1)th light flux form an apparent best image plane at a position different from the position of the best image plane formed by the first light flux and the k-th light flux;

wherein at the position of the best image plane of the first light flux and the k-th light flux, a wave front aberration of a ray in each light flux of the first wavelength from the first light flux to the k-th light flux passing in a required numerical aperture for the first optical information recording medium is made approximately $m_i\lambda_1$, where $m_i$ an integer and i=1,2, - - - , k, and wherein when conducting reproducing or recording of the first optical information recording medium, at the position of the best image plane of the first light flux and k-th light flux, an amount of the wave front aberration (w1) of the ray in each light flux of the first wavelength from the first light flux to the k-th light flux passing in the required numerical aperture for the first optical information recording medium satisfies the following conditional formula:

$$(m_i-0.30)\lambda_1 < w1 < (m_i+0.30)\lambda_1.$$

2. The optical pickup device set forth in claim 1, wherein when conducting reproducing or recording of the second optical information recording medium, the first light flux among the light flux of the second wavelength having passed the ring-shaped divided surfaces is converged on the second information recording surface in order to conduct reproducing or recording of the information of the second optical information recording medium, a spherical aberration component of a wave front aberration is made 0.07λ2 rms or less at a position of the best image plane, and at the position of thee best image plane of the first light flux, a wave front aberration of a ray in each light flux of the second wavelength from the first light flux to the (k-1)th light flux passing in a required numerical aperture for the second optical information recording medium is made approximately $n_i\lambda_2$, where $n_i$ is an integer and i=1,2, - - - , k-1.

3. The optical pickup device set forth in claim 2, wherein when conducting reproducing or recording of the second optical information recording medium, at the position of the best image plane of the first light flux, an amount of a wave front aberration (w2) of a ray in each light flux of the second wavelength from the first light flux to (k-1)th light flux passing in a required numerical aperture for the second optical information recording medium satisfies the following conditional formula:

$$(n_i-0.30)\lambda_2 \leq w2 \leq (n_i+0.30)\lambda_2.$$

4. The optical pickup device set forth in claim 2, wherein the difference between the maximum value of the integer the and the minimum value of the integer mi and the difference between the maximum value of the integer ni and the minimum value of the integer ni both are 2 or more.

5. The optical pickup device set forth in claim 1, wherein k is 4 and the following conditional formulas are satisfied:

$$0.62 \leq h1/0.5\phi\text{max} \leq 0.69$$

$$0.70 \leq h3/0.5\phi\text{max} \leq 0.80$$

where $\phi$max denotes a diameter of an aperture stop when conducting reproducing or recording of the first optical information recording medium, h1 denotes a height from a boundary of the ring-shaped stepped portion to divide the light flux of the first wavelength into the first light flux and the second light flux to the optical axis, and h3 denotes a height from a boundary of the ring-shaped stepped portion to divide the light flux of the first wavelength into the third light flux and the fourth light flux to the optical axis.

6. The optical pickup device set forth in claim 1, wherein the optical element is an objective lens having an aspherical surface.

7. The optical pickup device set forth in claim 6, wherein when conducting reproducing or recording of the first optical information recording medium, in the ring-shaped divided surfaces to pass at least two pieces of light flux among the light flux of the first wavelength from the second light flux to the (k-1)th light flux to form an apparent best image plane at a position different from that of the best image plane formed by the first light flux and the k-th light flux, an aspherical shape of the ring-shaped divided surfaces is different from that of the other ring-shaped divided surfaces.

8. The optical pickup device set forth in claim 1, wherein when conducting reproducing or recording of the first optical information recording medium, in the ring-shaped divided surfaces to pass at least two pieces of light flux among the light flux of the first wavelength from the second light flux to the (k-1)th light flux to form an apparent best image plane at a position different from that of the best image plane formed by the first light flux and the k-th light flux, a depth of the stepped portion of the ring-shaped divided surfaces at the optical axis side is different from a depth of the stepped portion at a side reverse to the optical axis side.

9. The optical pickup device set forth in claim 1, wherein K is 6, and when conducting reproducing or recording of the first optical information recording medium, the second light flux and the fifth light flux in the light flux of the first wavelength form an apparent best image plane at a position different from the position of the best image plane formed by the sixth light flux.

10. The optical pickup device set forth in claim 1, wherein k is 6 and the following conditional formulas are satisfied:

$$0.52 \leq h1/0.5\phi\text{max} \leq 0.67$$

$$0.70 \leq h5/0.5\phi\text{max} \leq 0.82$$

where $\phi$max denotes a diameter of an aperture stop when conducting reproducing or recording of the first optical information recording medium, h1 denotes a height from a boundary of the ring-shaped stepped portion to divide the light flux of the first wavelength into the first light flux and the second light flux to the optical axis, and h5 denotes a height from a boundary of the ring-shaped stepped portion to divide the light flux of the first wavelength into the fifth light flux and the sixth light flux to the optical axis.

11. An objective lens for use in an optical pickup device for conducting reproducing and/or recording of information of at least two kinds of optical information recording media, comprising:

ring-shaped divided surfaces partitioned by stepped portions provided on at least one surfaces of the objective lens, wherein the ring-shaped divided surfaces divide light flux incident on the objective lens into k (k≧ 4) pieces of ring-shaped light flux in which light flux nearest to the optical axis of the optical element is regarded as the first light flux and other light flux are called consecutively the second, the third - - - , and the k-th light flux toward the outer side in the direction perpendicular to the optical axis; wherein when conducting reproducing or recording of a first optical information recording medium having a first transparent substrate, among a first light flux of a wavelength (λ1) having passed the ring-shaped divided surfaces, the first light flux and the k-th light flux are converged on a first information recording surface so as to conduct reproducing or recording of information of the first optical information recording medium, a spherical aberration component of a wave front aberration is made 0.05λ1 rms or less at a position of the best image plane, and at least two pieces of light flux among the light flux of the first wavelength from the second light flux to the (k−1)th light flux form an apparent best image plane at a position different from the position of the best image plane formed by the first light flux and the k-th light flux;

wherein at the position of the best image plane of the first light flux and the k-th light flux, a wave front aberration of a ray in each light flux of the first wavelength from the first light flux to the k-th light flux passing in a required numerical aperture for the first optical information recording medium is made approximately $m_i \lambda_1$, where $m_i$ is an integer and i=1,2, - - - , k, wherein when conducting reproducing or recording of the first optical information recording medium, at the position of the best image plane of the first light flux and k-th light flux, an amount of the wave front aberration (w1) of the ray in each light flux of the first wavelength from the first light flux to the k-th light flux passing in the required numerical aperture for the first optical information recording medium satisfies the following conditional formula:

$(m_i-0.30)\lambda_1 < w1 < (m_i+0.30)\lambda_1.$

12. The objective lens set forth in claim 9, wherein when conducting reproducing or recording of the second optical information recording medium having a second transparent substrate thicker than the first transparent substrate, the first light flux among the light flux of the second wavelength having passed the ring-shaped divided surfaces is converged on the second information recording surface in order to conduct reproducing or recording of the information of the second optical information recording medium, a spherical aberration component of a wave front aberration is made 0.07λ2 rms or less at a position of the best image plane, and at the position of the best image plane of the first light flux, a wave front aberration of a ray in each light flux of the second wavelength from the first light flux to the (k-1)th light flux passing in a required numerical aperture for the second optical information recording medium is made approximately $n_i \lambda_2$, where $n_i$ is an integer and i=1,2, - - - , k-i.

13. The objective lens set forth in claim 12, wherein when conducting reproducing or recording of the second optical information recording medium, at the position of the best image plane of the first light flux, an amount of a wave front aberration (w2) of a ray in each light flux of the second wavelength from the first light flux to (k-1)th light flux passing in a required numerical aperture for the second optical information recording medium satisfies the following conditional formula:

$(n_i-0.30)\lambda_2 \leq w2 \leq (n_i+0.30)\lambda_2.$

14. The objective lens set forth in claim 12, wherein the difference between the maximum value of the integer mi and the minimum value of the integer mi and the difference between the maximum value of the integer ni and the minimum value of the integer ni both are 2 or more.

15. The objective lens set forth in claim 11, wherein k is 4 and the following conditional formulas are satisfied:

$0.62 \leq h1/0.5\phi max \leq 0.69$ $0.70 \leq h3/0.5\phi max \leq 0.80$ where φmax denotes a diameter of an aperture stop when conducting reproducing or recording of the first optical information recording medium, h1 denotes a height from a boundary of the ring-shaped stepped portion to divide the light flux of the first wavelength into the first light flux and the second light flux to the optical axis, and h3 denotes a height from a boundary of the ring-shaped stepped portion to divide the light flux of the first wavelength into the third light flux and the fourth light flux to the optical axis.

16. The objective lens set forth in claim 11, wherein when conducting reproducing or recording of the first optical information recording medium, in the ring-shaped divided surfaces to pass at least two pieces of light flux among the light flux of the first wavelength from the second light flux to the (k-1)th light flux to form an apparent best image plane at a position different from that of the best image plane formed by the first light flux and the kth light flux, a depth of the stepped portion of the ring-shaped divided surfaces at the optical axis side is different from a depth of the stepped portion at a side reverse to the optical axis side.

17. The objective lens set forth in claim 11, wherein when conducting reproducing or recording of the first optical information recording medium, in the ring-shaped divided surfaces to pass at least two pieces of light flux among the light flux of the first wavelength from the second light flux to the (k-1)th light flux to form an apparent best image plane at a position different from that of the best image plane formed by the first light flux and the kth light flux, an aspherical shape of the ring-shaped divided surfaces is different from that of the other ring-shaped divided surfaces.

18. The objective lens set forth in claim 11, wherein k is 6, and when conducting reproducing or recording of the first optical information recording medium, the second light flux and the fifth light flux in the light flux of the first wavelength form an apparent best image plane at a position different from the position of the best image plane formed by the sixth light flux.

19. The objective lens set forth in claim 11, wherein k is 6 and the following conditional formulas are satisfied:

$$0.52 \leq h1/0.5\phi max \leq 0.67$$
$$0.70 \leq h5/0.5\phi max \leq 0.82$$

where $\phi max$ denotes a diameter of an aperture stop when conducting reproducing or recording of the first optical information recording medium, h1 denotes a height from a boundary of the ring-shaped stepped portion to divide the light flux of the first wavelength into the first light flux and the second light flux to the optical axis, and h5 denotes a height from a boundary of the ring-shaped stepped portion to divide the light flux of the first wavelength into the fifth light flux and the sixth light flux to the optical axis.

20. An optical information recording media reproducing or recording apparatus for conducting reproducing and/or recording of information in at least two kinds of optical information recording media, comprising:
an optical pickup device comprising
a first light source to emit light flux having a first wavelength ($\lambda 1$) in order to conduct reproducing and/or recording of the information in a first optical information recording medium having a first transparent substrate
a second light source to emit light flux having a second wavelength ($\lambda 2$) longer than the first wavelength in order to conduct reproducing and/or recording of the information of a second optical information recording medium having a second transparent substrate, where the thickness of the second transparent substrate is thicker than the thickness of the first transparent substrate;
a converging optical system for converging the light flux having the first wavelength or the light flux having the second wavelength on the first information recording surface of the first optical information recording medium or on the second information recording surface of the second optical information recording medium; and
an optical detector for receiving and detecting the light flux reflected by the first information recording surface or by the second information recording surface,
wherein a required numerical aperture for the first optical information recording medium is larger than that for the second optical information recording medium;
wherein the optical pickup device comprises at least one optical element and the optical element has ring-shaped divided surfaces partitioned by stepped portions on at least one surface for dividing the light flux incident on the optical element into k ($k \geq 4$) pieces of ring-shaped light flux in which light flux nearest to the optical axis of the optical element is regarded as the first light flux and other light flux are called consecutively the second, the third - - - , and the k-th light flux toward the outer side in the direction perpendicular to the optical axis;
wherein when conducting reproducing or recording of the first optical information recording medium, the first light flux and the k-th light flux among the light flux of the first wavelength having passed the ring-shaped divided surfaces are converged on the first information recording surface in order to conduct reproducing or recording of the information of the first optical information recording medium, a spherical aberration component of a wave front aberration is made 0.05% 1 rms or less at a position of the best image plane, and at least two pieces of light flux among the light flux of the first wavelength from the second light flux to the (k-1)th light flux form an apparent best image plane at a position different from the position of the best image plane formed by the first light flux and the k-th light flux;
wherein at the position of the best image plane of the first light flux and the k-th light flux, a wave front aberration of a ray in each light flux of the first wavelength from the first light flux to the k-th light flux passing in a required numerical aperture for the first optical information recording medium is made approximately $m_i \lambda_1$, where $m_i$ is an integer and i=1,2, - - - , k, and
wherein when conducting reproducing or recording of the first optical information recording medium, at the position of the best image plane of the first light flux and k-th light flux, an amount of the wave front aberration (w1) of the ray in each light flux of the first wavelength from the first light flux to the k-th light flux passing in the required numerical aperture for the first optical information recording medium satisfies the following conditional formula:

$$(m_i - 0.30)\lambda_1 < w1 < (m_i + 0.30)\lambda_1.$$

* * * * *

UNITED STATES PATENT AND TRADEMARK OFFICE
CERTIFICATE OF CORRECTION

PATENT NO. : 6,781,943 B2
DATED : August 24, 2004
INVENTOR(S) : Shinichiro Saito It is certified that error appears in the above-identified patent and that said Letters Patent is hereby corrected as shown below:

<u>Title page,</u>
Item [57], ABSTRACT,
Line 5, "conduced" should read -- conducted --.

<u>Column 27,</u>
Line 5, "fist" should read -- first --.
Line 44, "$(m_j - 0.30) \lambda_l < w1 < (m_i + 0.30) \lambda_l$" should read
-- $(m_i - 0.30) \lambda_l < w1 < (m_i + 0.30) \lambda_l$ --.
Line 55, "thee" should read -- the --.

<u>Column 28,</u>
Line 6, "integer the" should read -- integer mi --.
Line 52, "K is 6," should read -- k is 6, --.

<u>Column 29,</u>
Line 13, "surfaces" should read -- surface --.
Line 57, "claim 9," should read -- claim 11, --.

<u>Column 31,</u>
Line 25, after "substrate" insert -- ; --.

Signed and Sealed this

Thirty-first Day of May, 2005

JON W. DUDAS
*Director of the United States Patent and Trademark Office*